(12) United States Patent
Salajegheh et al.

(10) Patent No.: US 10,846,705 B2
(45) Date of Patent: Nov. 24, 2020

(54) AUTOMATING CUSTOMER SERVICE AN INTERNET OF EVERYTHING ENVIRONMENT

(71) Applicant: QUALCOMM Incorporated, San Diego, CA (US)

(72) Inventors: Mastooreh Salajegheh, San Jose, CA (US); Vinay Sridhara, Santa Clara, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1429 days.

(21) Appl. No.: 14/627,389

(22) Filed: Feb. 20, 2015

(65) Prior Publication Data
US 2016/0247164 A1 Aug. 25, 2016

(51) Int. Cl.
*G06Q 30/00* (2012.01)
*G06Q 10/10* (2012.01)
*H04L 12/26* (2006.01)
*H04L 29/08* (2006.01)
*G06Q 50/06* (2012.01)

(52) U.S. Cl.
CPC .......... *G06Q 30/016* (2013.01); *G06Q 10/10* (2013.01); *H04L 43/065* (2013.01); *H04L 67/12* (2013.01); *G06Q 50/06* (2013.01)

(58) Field of Classification Search
CPC ..... H04L 67/12; H04L 43/065; G06Q 30/016; G06Q 10/10; G06Q 50/06
USPC ........................................................ 705/2–3
See application file for complete search history.

(56) References Cited

U.S. PATENT DOCUMENTS

| | | | |
|---|---|---|---|
| 8,280,009 | B2 | 10/2012 | Stepanian |
| 8,473,325 | B2 | 6/2013 | Barnhill, Jr. et al. |
| 8,856,289 | B2 | 10/2014 | Ansari et al. |
| 9,979,606 | B2 | 5/2018 | Gupta et al. |
| 2002/0128728 | A1 | 9/2002 | Murakami et al. |
| 2004/0103144 | A1 | 5/2004 | Sallam et al. |

(Continued)

FOREIGN PATENT DOCUMENTS

| | | |
|---|---|---|
| CN | 101854385 A | 10/2010 |
| CN | 103258401 A | 8/2013 |

(Continued)

OTHER PUBLICATIONS

ATIS ONEM2M, "Functional Architecture", TS-0001-V1.6.1, ONEM2M Technical Specification, 2015, 321 pages.

(Continued)

*Primary Examiner* — Joy Chng
(74) *Attorney, Agent, or Firm* — Muncy, Geissler, Olds & Lowe, P.C.

(57) ABSTRACT

Systems and methods are disclosed for automating customer service for a monitored device (MD). A method for an Internet of Everything management device to automate customer service for a monitored device comprises collecting sensor data from a plurality of sensors, wherein the plurality of sensors comprises a first sensor that is not included in the MD, determining whether the MD is exhibiting abnormal behavior based on an analysis of the collected sensor data, and transmitting a report to a customer service entity associated with the MD in response to a determination that the MD is exhibiting abnormal behavior.

30 Claims, 17 Drawing Sheets

(56) References Cited

U.S. PATENT DOCUMENTS

| | | | |
|---|---|---|---|
| 2007/0053513 A1* | 3/2007 | Hoffberg | G06K 9/00369 |
| | | | 380/201 |
| 2008/0136581 A1* | 6/2008 | Heilman | H04L 69/26 |
| | | | 340/3.1 |
| 2009/0199296 A1 | 8/2009 | Xie et al. | |
| 2009/0281676 A1 | 11/2009 | Beavis et al. | |
| 2011/0029658 A1 | 2/2011 | Werth et al. | |
| 2012/0108230 A1* | 5/2012 | Stepanian | H04L 67/28 |
| | | | 455/422.1 |
| 2013/0227114 A1 | 8/2013 | Vasseur et al. | |
| 2014/0047544 A1 | 2/2014 | Jakobsson et al. | |
| 2014/0053261 A1 | 2/2014 | Gupta et al. | |
| 2014/0244001 A1 | 8/2014 | Glickfield et al. | |
| 2014/0244768 A1 | 8/2014 | Shuman et al. | |
| 2015/0163121 A1* | 6/2015 | Mahaffey | H04L 63/1425 |
| | | | 707/687 |
| 2016/0212099 A1 | 7/2016 | Zou et al. | |
| 2016/0218949 A1 | 7/2016 | Dasgupta et al. | |
| 2016/0218951 A1 | 7/2016 | Vasseur et al. | |
| 2016/0219065 A1 | 7/2016 | Dasgupta et al. | |
| 2016/0219066 A1 | 7/2016 | Vasseur et al. | |
| 2016/0219070 A1 | 7/2016 | Vasseur et al. | |
| 2016/0219071 A1 | 7/2016 | Vasseur et al. | |
| 2016/0261621 A1 | 9/2016 | Srivastava et al. | |

FOREIGN PATENT DOCUMENTS

| | | |
|---|---|---|
| CN | 103280060 A | 9/2013 |
| CN | 104315679 A | 1/2015 |
| JP | 2002342185 A | 11/2002 |
| JP | 2007526992 A | 9/2007 |
| JP | 2008129714 A | 6/2008 |
| JP | 2008269215 A | 11/2008 |
| JP | 2015012447 A | 1/2015 |
| WO | 2005006363 A2 | 1/2005 |
| WO | 2010131259 A2 | 11/2010 |
| WO | 2015157108 | 10/2015 |

OTHER PUBLICATIONS

ATIS ONEM2M, "Service Layer Core Protocol Specification", TS-0004-V1.0.1, ONEM2M Technical Specification, 2015, 217 pages.

Chekina L., et al., "Detection of deviations in mobile applications network behavior", arXiv:1208.0564v2, Aug. 5, 2012 (Aug. 5, 2012), 5 pages, XP055107301, Retrieved from the Internet: URL: http://arxiv.org/abs/1208.0564v2 [retrieved on Nov. 1, 2013] the whole document.

El-Zabadani H., et al., "The Gator Tech Smart House: A Programmable Pervasive Space," Computer, Mar. 1, 2005, vol. 38 (3), pp. 50-60, XP011129155, ISSN: 0018-9162, DOI: 10.1109/MC.2005. 107 p. 52, left-hand column Section "Sensor Platform"; p. 55.

International Search Report and Written Opinion—PCT/US2016/015626—ISA/EPO—dated Apr. 5, 2016.

Patricio G., et al., "Smart House Monitoring and Actuating System Development using Automatic Code Generation," 7th IEEE International Conference on Industrial Informatics, Jun. 23, 2009, pp. 256-261, XP031504251, ISBN: 978-1-4244-3759-7, Section "Node Interaction"; p. 258.

Masuda K., et al., "A Systematic Classification Model and Detection System for the Malfunction of Household Appliances", The Special Interest Group Technical Reports of Information Processing Society of Japan, vol. 2006, No. 54, May 23, 2006, pp. 43-50 (2006-UBI-11(7)).

Shikano H., et al., "Proposal and Evaluation of Efficient Sensing Information Integration Technique" IEICE (The Institute of Electronics, Information and Communication Engineers) Technical Report, vol. 109, No. 436, Feb. 22, 2010, pp. 47-52 (CAS2009-86, SIP2009-131, CS2009-81).

* cited by examiner

AUTOMATING CUSTOMER SERVICE AN INTERNET OF EVERYTHING ENVIRONMENT

BACKGROUND

Aspects of this disclosure relate generally to telecommunications, and more particularly to interactions between user equipment and other devices in a shared wireless access environment.

The Internet is a global system of interconnected computers and computer networks that use a standard Internet protocol suite (e.g., the Transmission Control Protocol (TCP) and Internet Protocol (IP)) to communicate with each other. The Internet of Everything (IoE) is based on the idea that everyday objects, not just computers and computer networks, can be readable, recognizable, locatable, addressable, and controllable via an IoE communications network (e.g., an ad-hoc system or the Internet).

A number of market trends are driving development of IoE devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoE. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

As such, in the near future, increasing development in IoE technologies will lead to numerous IoE devices surrounding a user at home, in vehicles, at work, and many other locations. Accordingly, a need exists for an IoE management device that leverages large amounts of disorganized data in useful ways.

SUMMARY

In one aspect, the present disclosure provides a method for an Internet of Everything management device to automate customer service for a monitored device (MD). The method may comprise, for example, collecting sensor data from a plurality of sensors, wherein the plurality of sensors comprises a first sensor that is not included in the MD, determining whether the MD is exhibiting abnormal behavior based on an analysis of the collected sensor data, and transmitting a report to a customer service entity associated with the MD in response to a determination that the MD is exhibiting abnormal behavior.

In another aspect, the present disclosure provides an Internet of Everything management device for automating customer service for a MD. The Internet of Everything management device may comprise, for example, a processor configured to collect sensor data from a plurality of sensors, wherein the plurality of sensors comprises a first sensor that is not included in the MD, determine whether the MD is exhibiting abnormal behavior based on an analysis of the collected sensor data, and transmit a report to a customer service entity associated with the MD in response to a determination that the MD is exhibiting abnormal behavior, and a memory, coupled to the processor, to store related data and instructions.

In another aspect, the present disclosure provides another Internet of Everything management device for automating customer service for a MD. The Internet of Everything management device may comprise, for example, means for collecting sensor data from a plurality of sensors, wherein the plurality of sensors comprises a first sensor that is not included in the MD, means for determining whether the MD is exhibiting abnormal behavior based on an analysis of the collected sensor data, and means for transmitting a report to a customer service entity associated with the MD in response to a determination that the MD is exhibiting abnormal behavior.

In another aspect, the present disclosure provides a non-transitory computer-readable medium comprising code, which, when executed by a processor, causes the processor to perform operations for automating customer service for a MD. The computer-readable medium may comprise, for example, code for collecting sensor data from a plurality of sensors, wherein the plurality of sensors comprises a first sensor that is not included in the MD, code for determining whether the MD is exhibiting abnormal behavior based on an analysis of the collected sensor data, and code for transmitting a report to a customer service entity associated with the MD in response to a determination that the MD is exhibiting abnormal behavior.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1A:
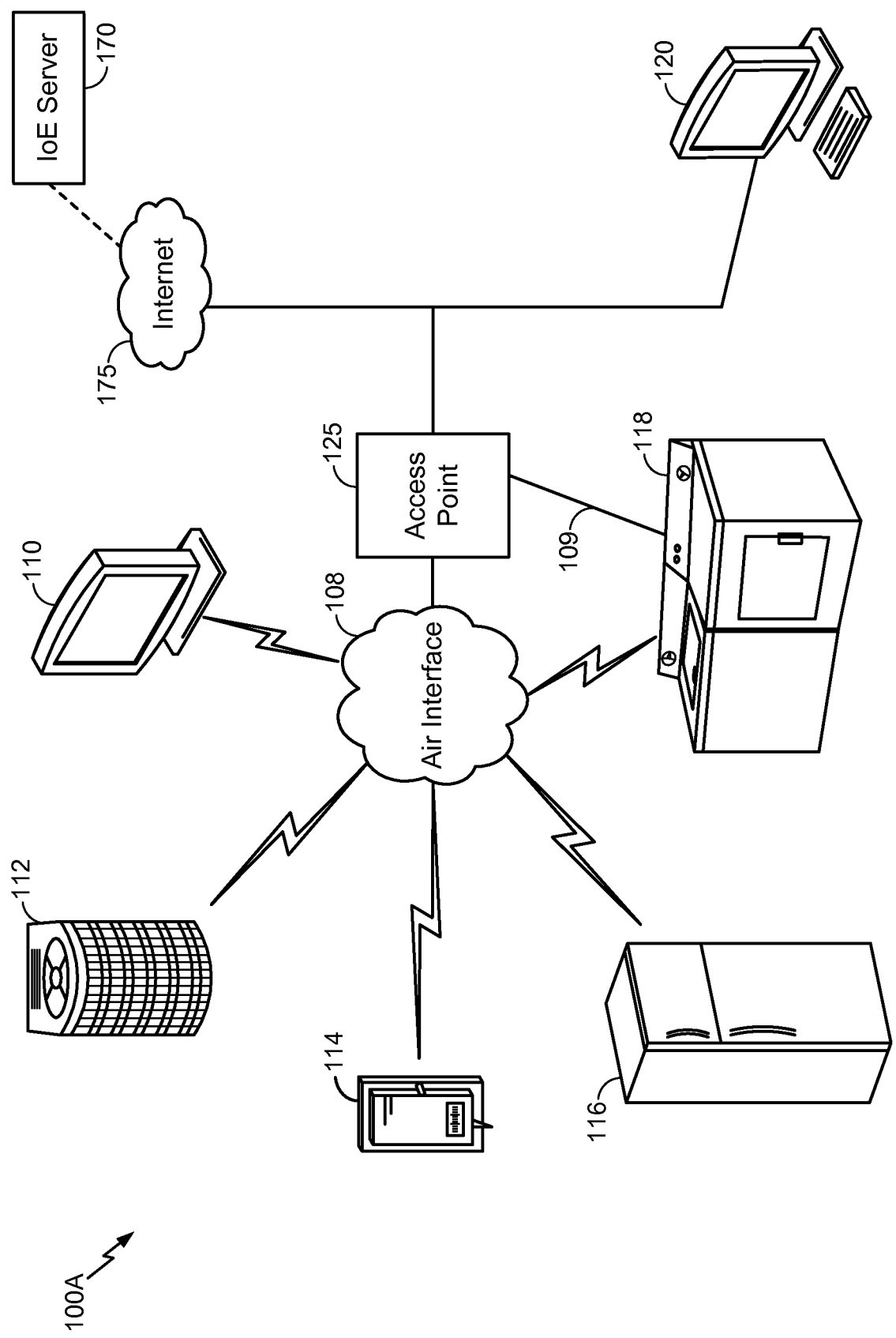
FIG. 1A illustrates a high-level system architecture of a wireless communications system in accordance with an aspect of the disclosure.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

Various aspects are disclosed in the following description and related drawings to show specific examples relating to exemplary aspects of an IoE management device. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and aspects disclosed herein.

The word "exemplary" is used herein to mean "serving as an example, instance, or illustration." Any aspect described herein as "exemplary" is not necessarily to be construed as preferred or advantageous over other aspects Likewise, the term "aspects" does not require that all aspects include the discussed feature, advantage or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Everything device" (or "IoE device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoE device may have a passive communication interface, such as a quick response (QR) code, a radio-frequency identification (RFID) tag, an NFC tag, or the like, or an active communication interface, such as a modem, a transceiver, a transmitter-receiver, or the like. An IoE device can have a particular set of attributes (e.g., a device state or status, such as whether the IoE device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoE network such as a local ad-hoc network or the Internet. For example, IoE devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoE network. IoE devices may also include cell phones, desktop computers, laptop computers, tablet computers, personal digital assistants (PDAs), etc. Accordingly, the IoE network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoE devices, which include a television 110, an outdoor air conditioning unit 112, a thermostat 114, a refrigerator 116, and a washer and dryer 118.

Referring to FIG. 1A, IoE devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoE devices 110-118 communicating over the air interface 108 and IoE device 118 communicating over the direct wired connection 109, each IoE device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoE device and/or contain functionality to manage an IoE network/group, such as the network/group of IoE devices 110-118.

The access point 125 may be connected to the Internet 175 via, for example, an optical communication system, such as FiOS, a cable modem, a digital subscriber line (DSL) modem, or the like. The access point 125 may communicate with IoE devices 110-120 and the Internet 175 using the standard Internet protocols (e.g., TCP/IP).

Referring to FIG. 1A, an IoE server 170 is shown as connected to the Internet 175. The IoE server 170 can be implemented as a plurality of structurally separate servers, or alternately may correspond to a single server. In an aspect, the IoE server 170 is optional (as indicated by the dotted line), and the group of IoE devices 110-120 may be a peer-to-peer (P2P) network. In such a case, the IoE devices 110-120 can communicate with each other directly over the air interface 108 and/or the direct wired connection 109. Alternatively, or additionally, some or all of IoE devices 110-120 may be configured with a communication interface independent of air interface 108 and direct wired connection 109. For example, if the air interface 108 corresponds to a Wi-Fi interface, one or more of the IoE devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
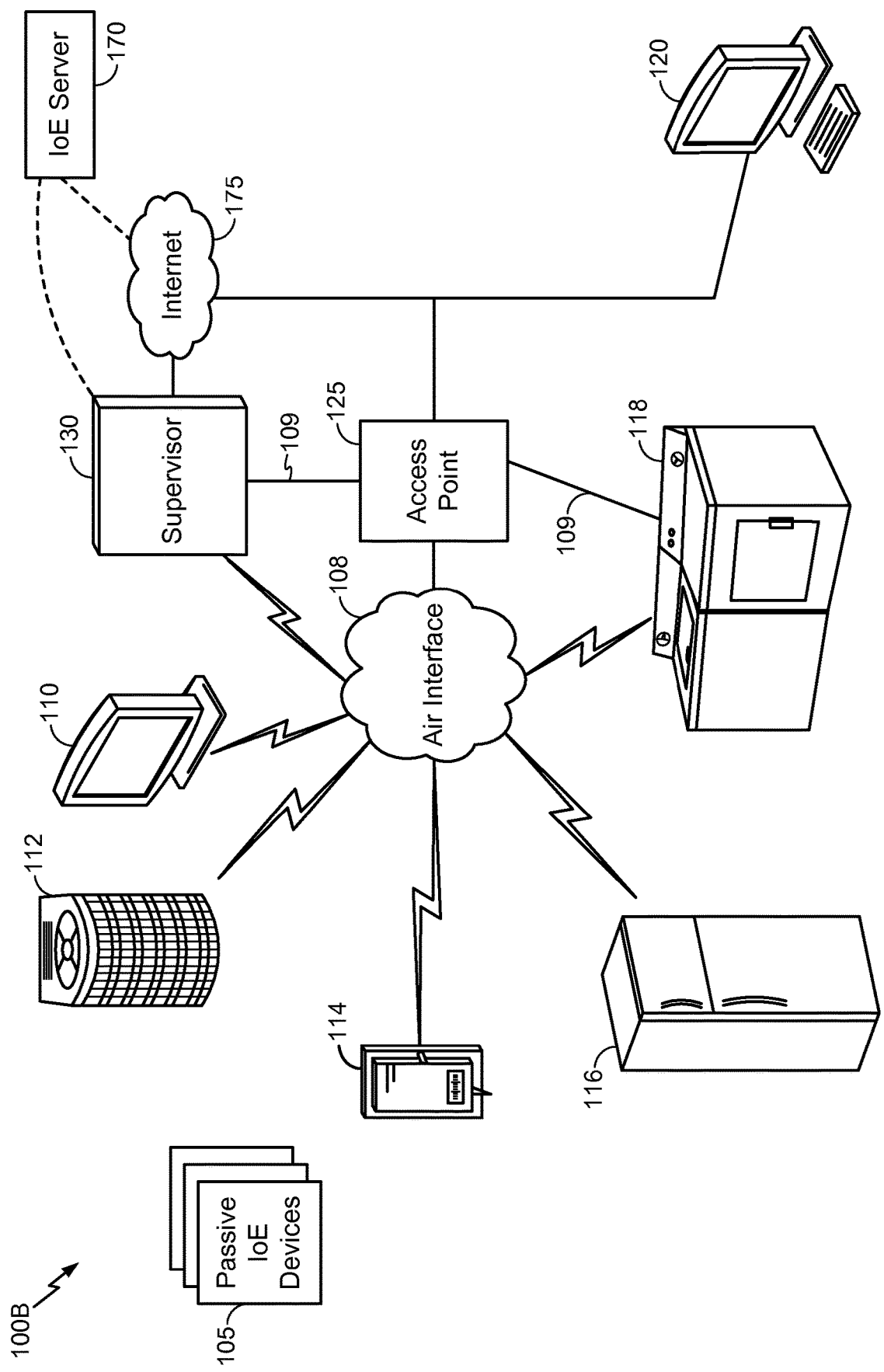
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoE devices. In general, the wireless communications system 100B shown in FIG. 1B may include various components that are the same and/or substantially similar to the wireless communications system 100A shown in FIG. 1A, which was described in greater detail above (e.g., various IoE devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoE server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoE manager 130 or IoE manager device 130. As such, where the following description uses the term "supervisor device" 130, those skilled in the art will appreciate that any references to an IoE manager, group owner, or similar terminology may refer to the supervisor device 130 or another physical or logical component that provides the same or substantially similar functionality.

In one aspect of the disclosure, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoE devices 110-120 in the wireless communications system 100B. The supervisor device 130 may have a wired or wireless connection to the Internet 175 and optionally to the IoE server 170 (shown as a dotted line). The supervisor device 130 may obtain information from the Internet 175 and/or the IoE server 170 that can be used to further monitor or manage attributes, activities, or other states associated with the various IoE devices 110-120. The supervisor device 130 may be a standalone device or one of IoE devices 110-120, such as computer 120. The supervisor device 130 may be a physical device or a software application running on a physical device. The supervisor device 130 may include a user interface that can output information relating to the monitored attributes, activities, or other states associated with the IoE devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoE devices 105 (in contrast to the active IoE devices 110-120) that can be coupled to or otherwise made part of the wireless communications system 100B. In general, the passive IoE devices 105 may include barcoded devices, Bluetooth devices, radio frequency (RF) devices, RFID tagged devices, infrared (IR)

devices, NFC tagged devices, or any other suitable device that can provide its identifier and attributes to another device when queried over a short range interface. Active IoE devices may detect, store, communicate, act on, and/or the like, changes in attributes of passive IoE devices.

For example, passive IoE devices 105 may include a coffee cup and a container of orange juice that each have an RFID tag or barcode. A cabinet IoE device and the refrigerator IoE device 116 may each have an appropriate scanner or reader that can read the RFID tag or barcode to detect when the coffee cup and/or the container of orange juice passive IoE devices 105 have been added or removed. In response to the cabinet IoE device detecting the removal of the coffee cup passive IoE device 105 and the refrigerator IoE device 116 detecting the removal of the container of orange juice passive IoE device, the supervisor device 130 may receive one or more signals that relate to the activities detected at the cabinet IoE device and the refrigerator IoE device 116. The supervisor device 130 may then infer that a user is drinking orange juice from the coffee cup and/or likes to drink orange juice from a coffee cup.

Although the foregoing describes the passive IoE devices 105 as having some form of RFID tag or barcode communication interface, the passive IoE devices 105 may include one or more devices or other physical objects that do not have such communication capabilities. For example, certain IoE devices may have appropriate scanner or reader mechanisms that can detect shapes, sizes, colors, and/or other observable features associated with the passive IoE devices 105 to identify the passive IoE devices 105. In this manner, any suitable physical object may communicate its identity and attributes and become part of the wireless communication system 100B and be observed, monitored, controlled, or otherwise managed with the supervisor device 130. Further, passive IoE devices 105 may be coupled to or otherwise made part of the wireless communications system 100A in FIG. 1A and observed, monitored, controlled, or otherwise managed in a substantially similar manner.

Figure 1C:
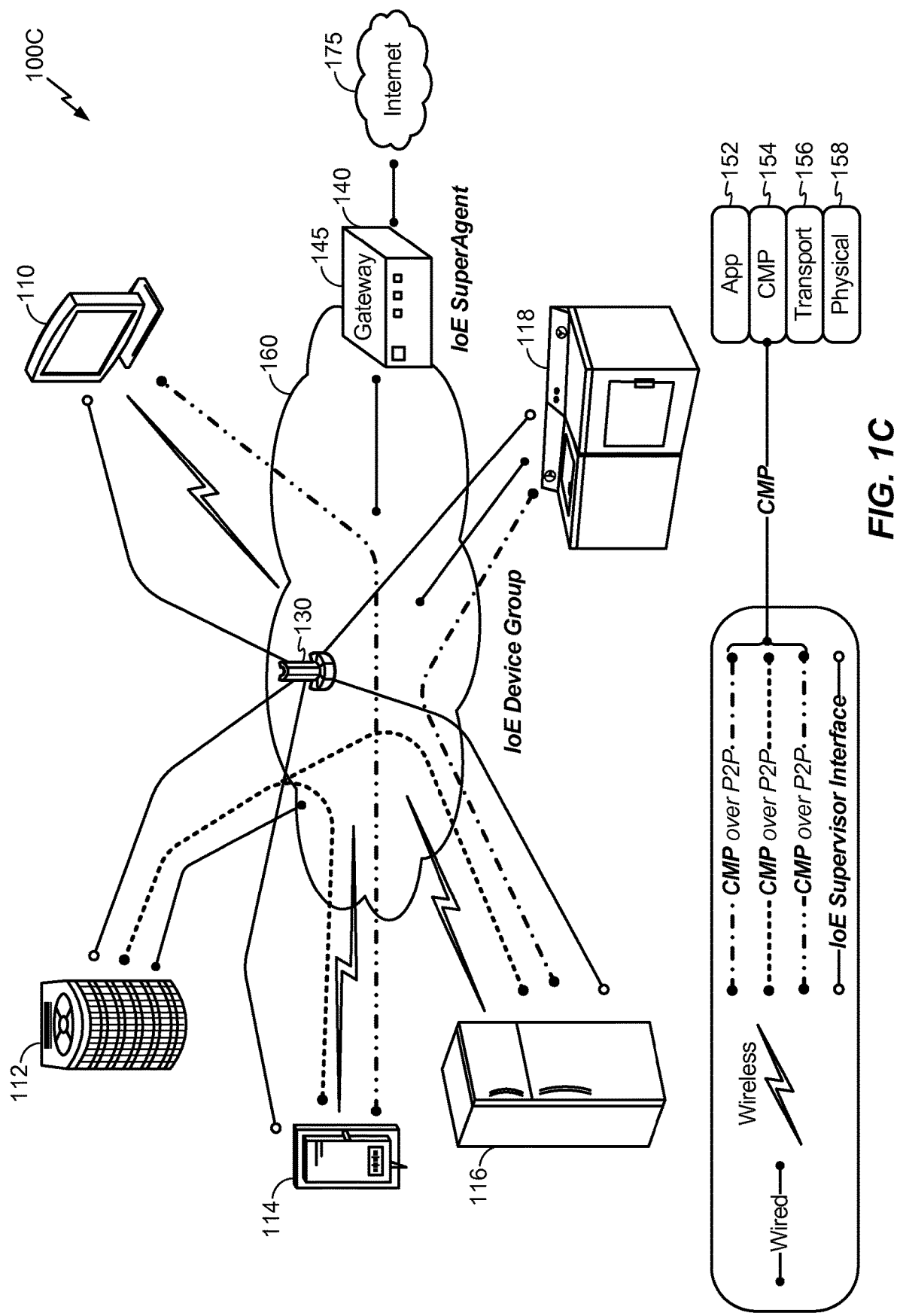
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoE devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoE devices 110-118 and the supervisor device 130. As shown in FIG. 1C, the supervisor device 130 communicates with each of the IoE devices 110-118 over an IoE supervisor interface. Further, IoE devices 110 and 114, IoE devices 112, 114, and 116, and IoE devices 116 and 118, communicate directly with each other.

The IoE devices 110-118 make up an IoE group 160. An IoE device group 160 is a group of locally connected IoE devices, such as the IoE devices connected to a user's home network. Although not shown, multiple IoE device groups may be connected to and/or communicate with each other via an IoE SuperAgent 140 connected to the Internet 175. At a high level, the supervisor device 130 manages intra-group communications, while the IoE SuperAgent 140 can manage inter-group communications. Although shown as separate devices, the supervisor device 130 and the IoE SuperAgent 140 may be, or reside on, the same device (e.g., a standalone device or an IoE device, such as computer 120 in FIG. 1A). Alternatively, the IoE SuperAgent 140 may correspond to or include the functionality of the access point 125. As yet another alternative, the IoE SuperAgent 140 may correspond to or include the functionality of an IoE server, such as IoE server 170. The IoE SuperAgent 140 may encapsulate gateway functionality 145.

Each IoE device 110-118 can treat the supervisor device 130 as a peer and transmit attribute/schema updates to the supervisor device 130. When an IoE device needs to communicate with another IoE device, it can request the pointer to that IoE device from the supervisor device 130 and then communicate with the target IoE device as a peer. The IoE devices 110-118 communicate with each other over a peer-to-peer communication network using a common messaging protocol (CMP). As long as two IoE devices are CMP-enabled and connected over a common communication transport, they can communicate with each other. In the protocol stack, the CMP layer 154 is below the application layer 152 and above the transport layer 156 and the physical layer 158.

Figure 1D:
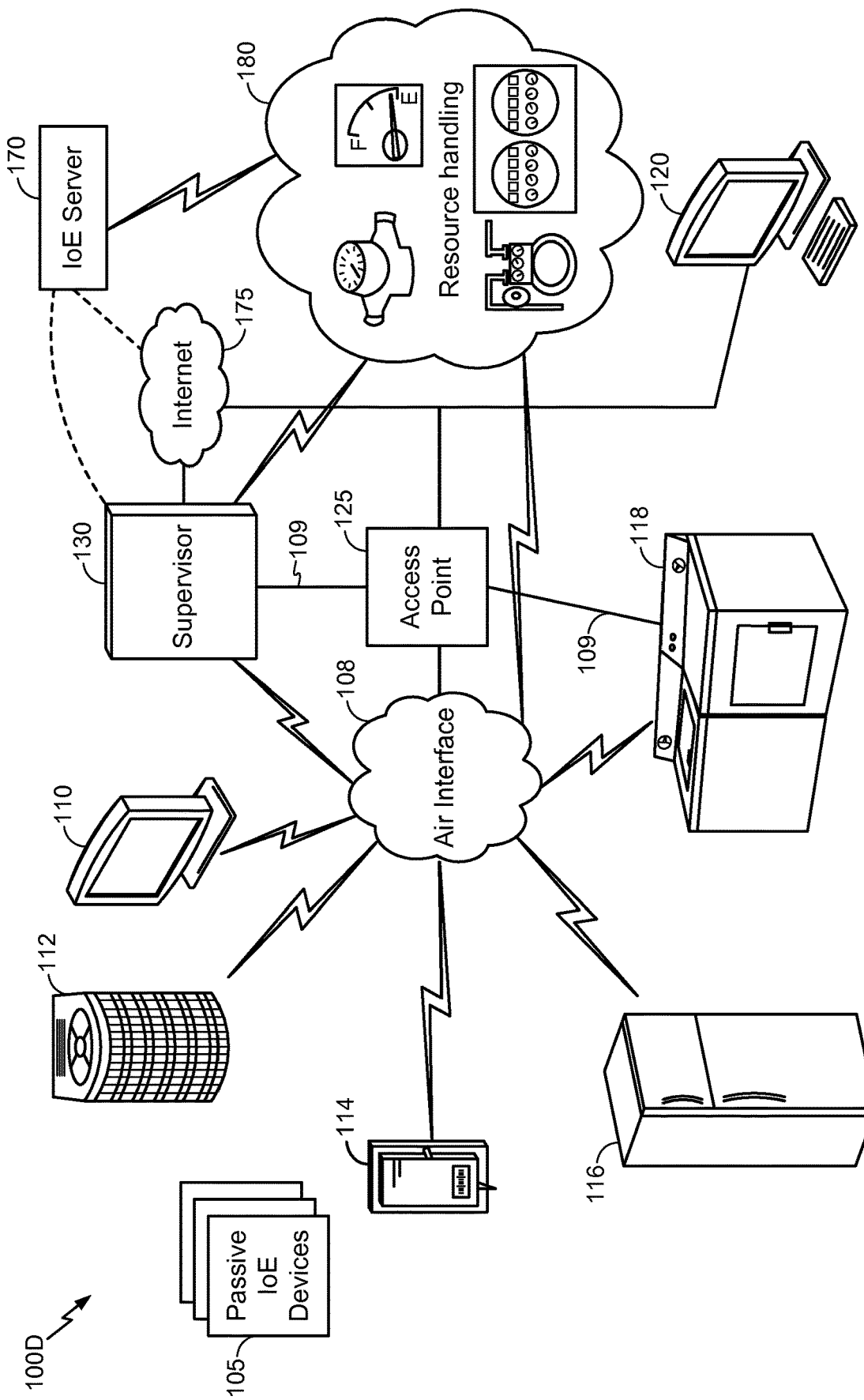
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoE devices. In general, the wireless communications system 100D shown in FIG. 1D may include various components that are the same and/or substantially similar to the wireless communications systems 100A-C shown in FIGS. 1A-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoE. However, the Internet 175 is just one example of a resource that is regulated, and any resource could be regulated using the concept of the IoE. Other resources that can be regulated include, but are not limited to, electricity, gas, storage, security, and the like. An IoE device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoE devices can communicate with each other to regulate their use of a resource 180. For example, IoE devices such as a toaster, a computer, and a hairdryer may communicate with each other over a Bluetooth communication interface to regulate their use of electricity (the resource 180). As another example, IoE devices such as a desktop computer, a telephone, and a tablet computer may communicate over a Wi-Fi communication interface to regulate their access to the Internet 175 (the resource 180). As yet another example, IoE devices such as a stove, a clothes dryer, and a water heater may communicate over a Wi-Fi communication interface to regulate their use of gas. Alternatively, or additionally, each IoE device may be connected to an IoE server, such as IoE server 170, which has logic to regulate their use of the resource 180 based on information received from the IoE devices.

Figure 1E:
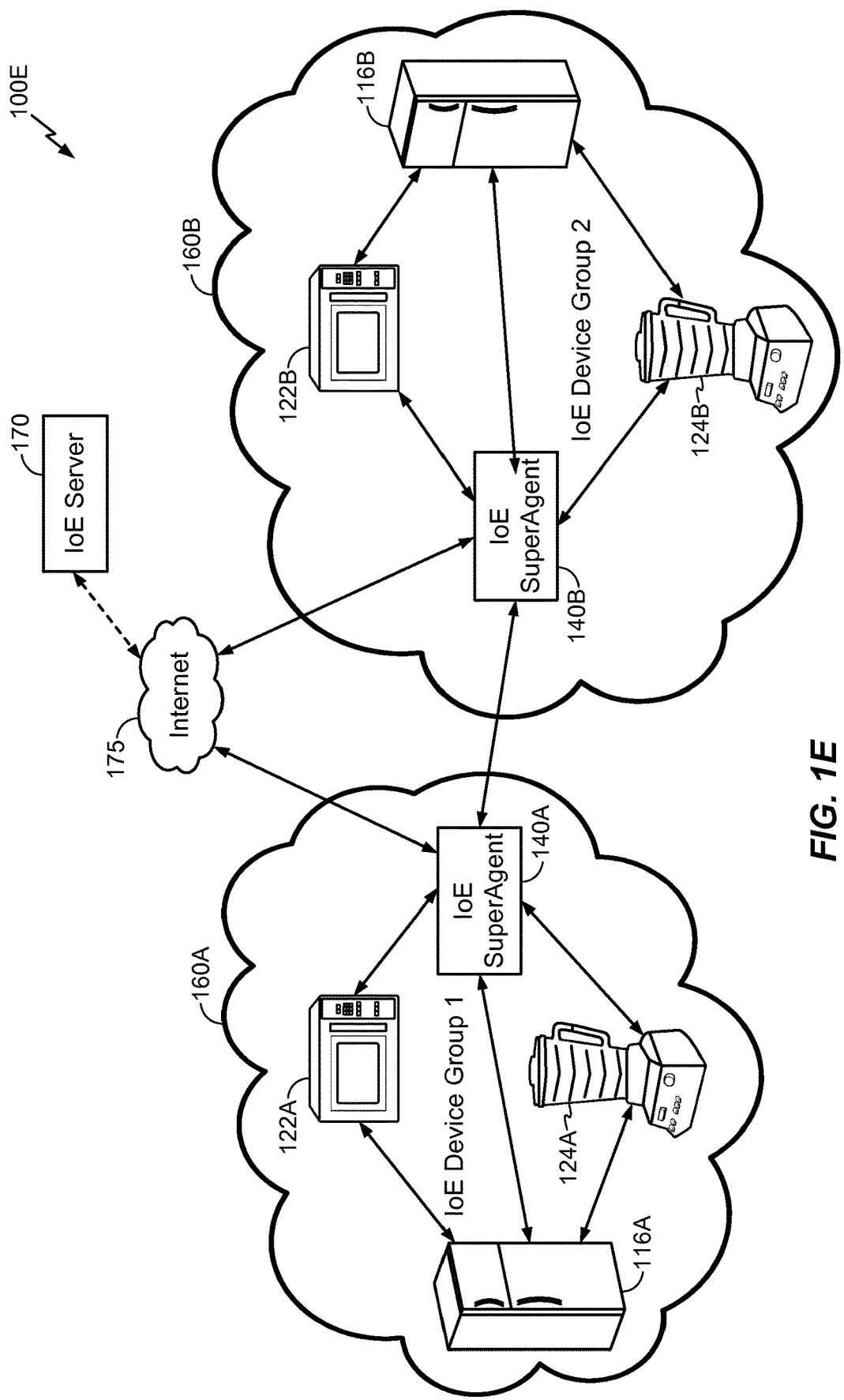
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoE devices. In general, the wireless communications system 100E shown in FIG. 1E may include various components that are the same and/or substantially similar to the wireless communications systems 100A-D shown in FIGS. 1A-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoE device groups 160A and 160B. Multiple IoE device groups may be connected to and/or communicate with each other via an IoE SuperAgent connected to the Internet 175. At a high level, an IoE SuperAgent may manage inter-group communications among IoE device groups. For example, in FIG. 1E, the IoE device group 160A includes IoE devices 116A, 122A, and 124A and an IoE SuperAgent 140A, while IoE device group 160B includes IoE devices 116B, 122B, and 124B and an IoE SuperAgent 140B. As such, the IoE SuperAgents 140A and 140B may connect to the Internet 175 and communicate with each other over the Internet 175 and/or communicate with each other directly to facilitate communication between the IoE device groups 160A and 160B. Furthermore, although FIG. 1E illustrates two IoE device groups 160A and 160B communicating with each other via IoE SuperAgents 140A and 140B, those skilled in the art will appreciate that any number of IoE device groups may suitably communicate with each other using IoE Super-Agents.

Figure 2A:
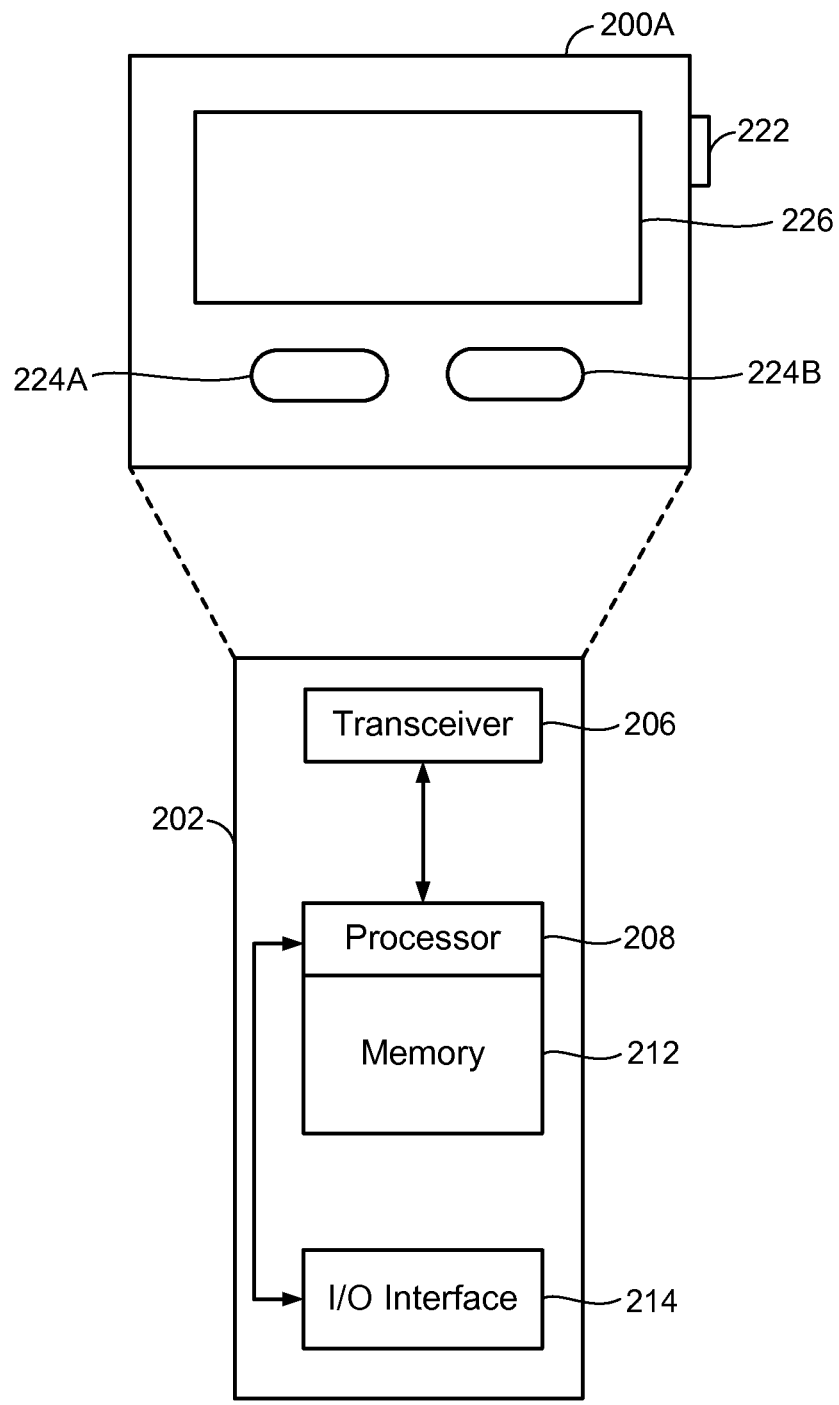
FIG. 2A illustrates an exemplary IoE device in accordance with aspects of the disclosure.

FIG. 2A illustrates a high-level example of an IoE device 200A in accordance with aspects of the disclosure. While external appearances and/or internal components can differ significantly among IoE devices, most IoE devices will have some sort of user interface, which may comprise a display and a means for user input. IoE devices without a user interface can be communicated with remotely over a wired or wireless network, such as air interface 108 in FIGS. 1A-B.

As shown in FIG. 2A, in an example configuration for the IoE device 200A, an external casing of IoE device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoE device 200A, the IoE device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoE devices, such as IoE device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoE device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoE device 200A.

Accordingly, an aspect of the disclosure can include an IoE device (e.g., IoE device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoE device 200A in FIG. 2A are to be considered merely illustrative and the disclosure is not limited to the illustrated features or arrangement.

Figure 2B:
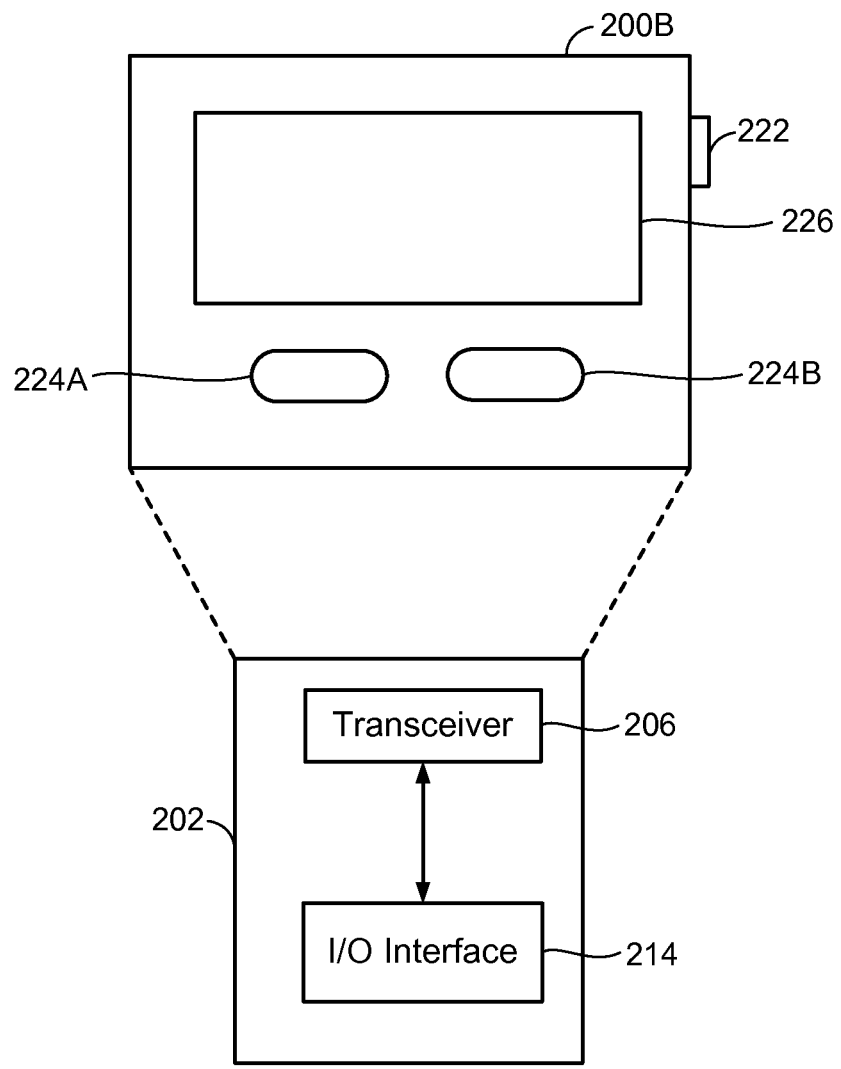
FIG. 2B illustrates an exemplary passive IoE device in accordance with aspects of the disclosure.

FIG. 2B illustrates a high-level example of a passive IoE device 200B in accordance with aspects of the disclosure. In general, the passive IoE device 200B shown in FIG. 2B may include various components that are the same and/or substantially similar to the IoE device 200A shown in FIG. 2A, which was described in greater detail above. As such, for brevity and ease of description, various details relating to certain components in the passive IoE device 200B shown in FIG. 2B may be omitted herein to the extent that the same or similar details have already been provided above in relation to the IoE device 200A illustrated in FIG. 2A.

The passive IoE device 200B shown in FIG. 2B may generally differ from the IoE device 200A shown in FIG. 2A in that the passive IoE device 200B may not have a processor, internal memory, or certain other components. Instead, in one aspect, the passive IoE device 200B may only include an I/O interface 214 or other suitable mechanism that allows the passive IoE device 200B to be observed, monitored, controlled, managed, or otherwise known within a controlled IoE network. For example, in one aspect, the I/O interface 214 associated with the passive IoE device 200B may include a barcode, Bluetooth interface, radio frequency (RF) interface, RFID tag, IR interface, NFC interface, or any other suitable I/O interface that can provide an identifier and attributes associated with the passive IoE device 200B to another device when queried over a short range interface (e.g., an active IoE device, such as IoE device 200A, that can detect, store, communicate, act on, or otherwise process information relating to the attributes associated with the passive IoE device 200B).

Although the foregoing describes the passive IoE device 200B as having some form of RF, barcode, or other I/O interface 214, the passive IoE device 200B may comprise a device or other physical object that does not have such an I/O interface 214. For example, certain IoE devices may have appropriate scanner or reader mechanisms that can detect shapes, sizes, colors, and/or other observable features associated with the passive IoE device 200B to identify the passive IoE device 200B. In this manner, any suitable physical object may communicate its identity and attributes and be observed, monitored, controlled, or otherwise managed within a controlled IoE network.

Figure 3:
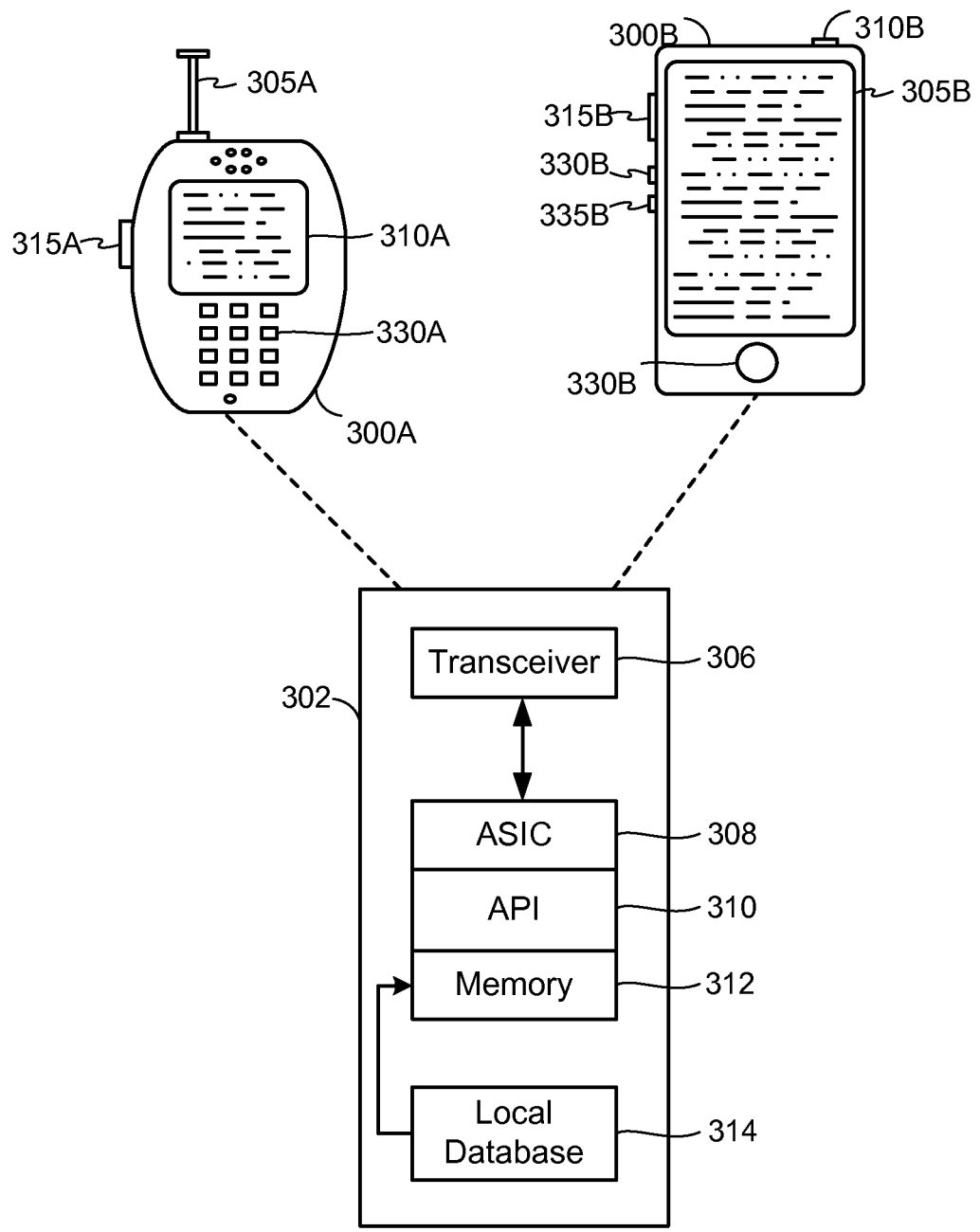
FIG. 3 illustrates examples of user equipments (UEs) in accordance with aspects of the disclosure.

FIG. 3 illustrates examples of UEs (i.e., client devices) in accordance with an aspect of the disclosure. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 330A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the Internet 175 and/or other remote servers and networks (e.g., IoE server 170, web URLs, etc.). The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the disclosure is not limited to the illustrated features or arrangement.

The wireless communication to and from the UEs 300A and/or 300B can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs using a variety of networks and configurations. Accordingly, the illustrations provided herein are not intended to limit the aspects of the disclosure and are merely to aid in the description of aspects of aspects of the disclosure.

Figure 4:
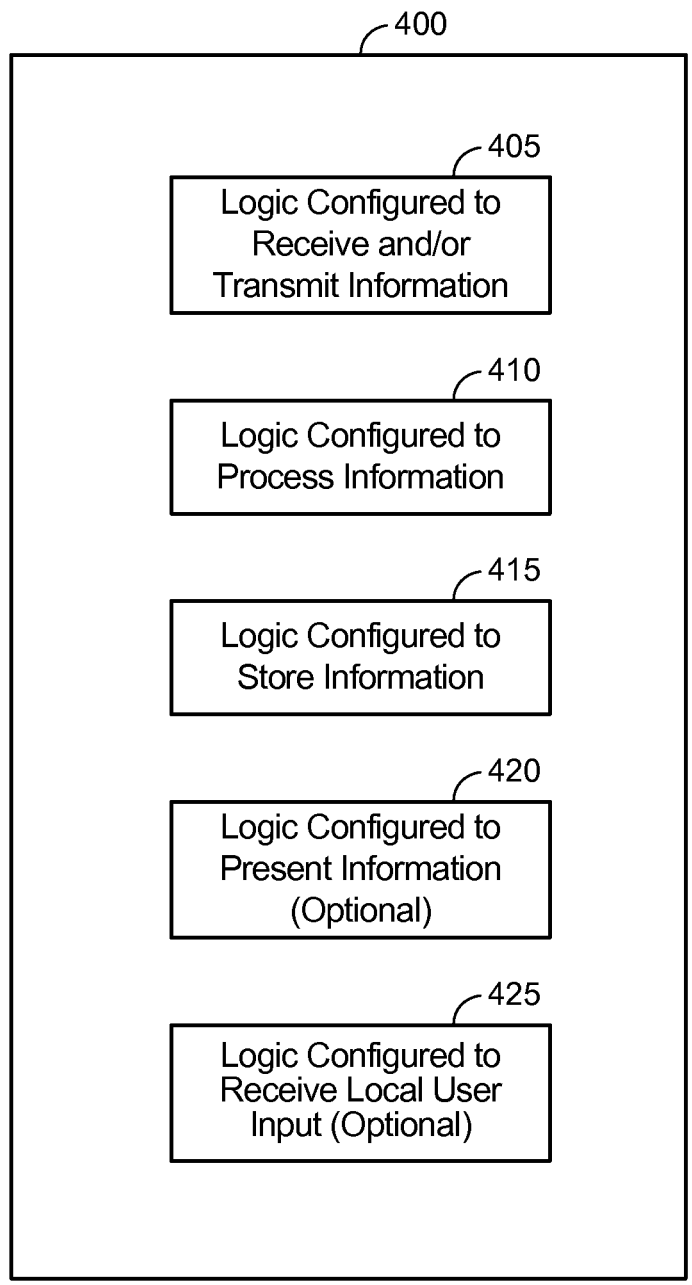
FIG. 4 illustrates a communication device that includes logic configured to perform functionality in accordance with an aspect of the disclosure.

FIG. 4 illustrates a communication device 400 that includes logic configured to perform functionality. The communication device 400 can correspond to any of the above-noted communication devices, including but not limited to IoE devices 110-120, IoE device 200A, IoE device 200B, UE 300A, UE 300B, any components coupled to the Internet 175 (e.g., the IoE server 170), and so on. Thus, communication device 400 can correspond to any electronic device that is configured to communicate with (or facilitate communication with) one or more other entities over the wireless communications systems 100A-E of FIGS. 1A-E.

Referring to FIG. 4, the communication device 400 includes logic configured to receive and/or transmit information 405. In an example, if the communication device 400 corresponds to a wireless communications device (e.g., IoE device 200A, passive IoE device 200B, UE 300A, and/or UE 300B), the logic configured to receive and/or transmit information 405 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., the IoE server 170), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM, flash memory, ROM, erasable programmable ROM (EPROM), EEPROM, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400.

For example, if the communication device 400 corresponds to the IoE device 200A as shown in FIG. 2A or the passive IoE device 200B as shown in FIG. 2B, the logic configured to present information 420 can include the display 226. In a further example, if the communication device 400 corresponds to the UE 300A as shown in FIG. 3A or the UE 300B as shown in FIG. 3B, the logic configured to present information 420 can include the display 310A or the touchscreen display 305B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to the IoE device 200A as shown in FIG. 2A or the passive IoE device 200B as shown in FIG. 2B, the logic configured to receive local user input 425 can include the buttons 222, 224A, and 224B, the display 226 (if a touchscreen), etc. In a further example, if the communication device 400 corresponds to the UE 300A as shown in FIG. 3A or the UE 300B as shown in FIG. 3B, the logic configured to receive local user input 425 can include button 315A, keypad 330A, touchscreen display 305B, peripheral buttons 310B, 315B, 320B and 325B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 5A:
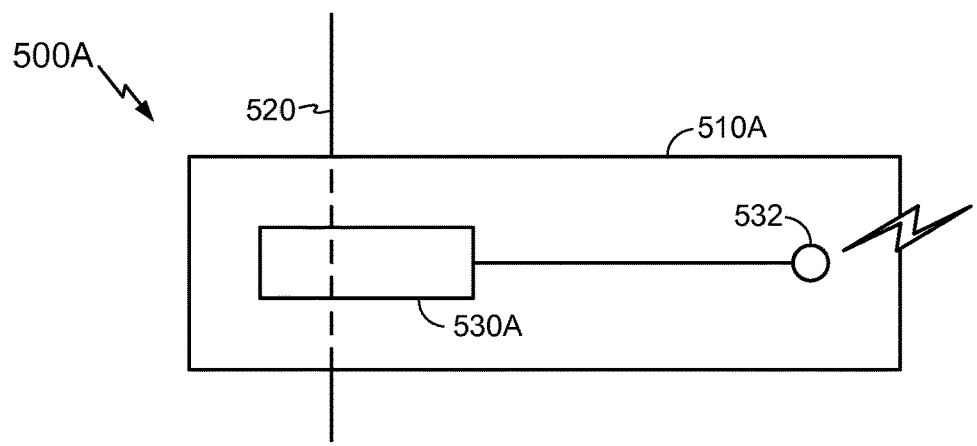
FIG. 5A illustrates an example of an arrangement of a MD and a sensor, according to one aspect of the disclosure.
Figure 5B:
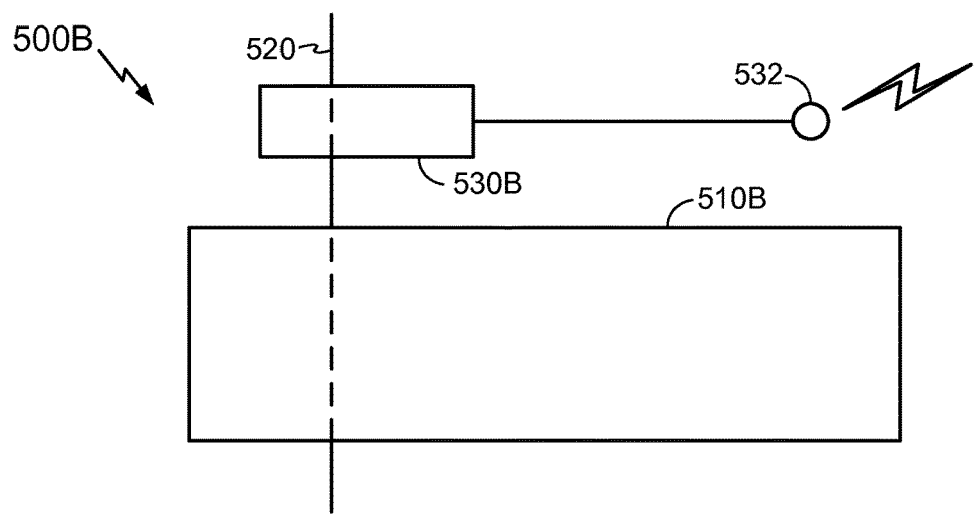
FIG. 5B illustrates another example of an arrangement of a MD and a sensor, according to one aspect of the disclosure.
Figure 5C:
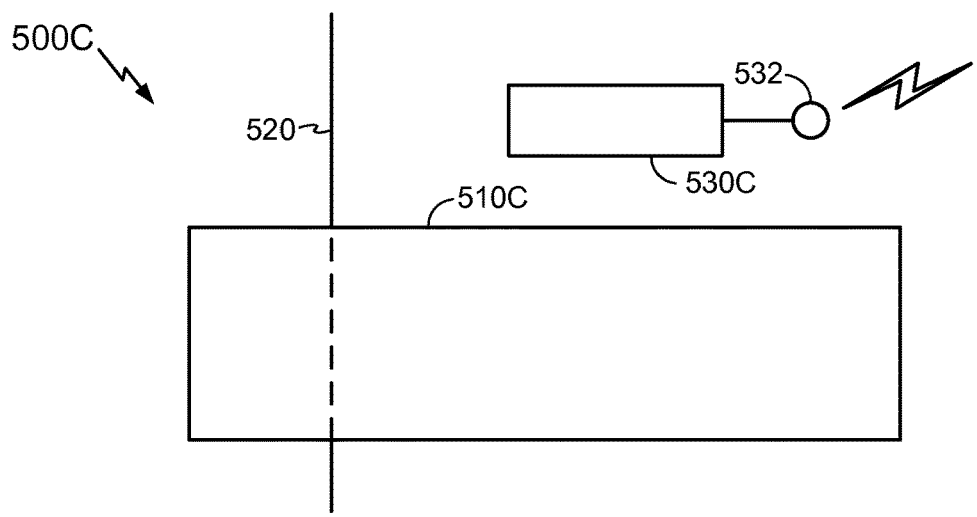
FIG. 5C illustrates yet another example of an arrangement of a MD and a sensor, according to one aspect of the disclosure.

FIG. 5A, FIG. 5B, and FIG. 5C generally illustrate three possible arrangements of a monitored device (MD) in an IoE environment. In each of the three possible arrangements, a sensor 530 transmits sensor values relating to the behavior of the MD 510. The sensor 530 includes a transmitter 532 from which the sensor value is transmitted. Although wireless transmission is depicted in FIG. 5A, FIG. 5B, and FIG. 5C, it will be understood that the sensor values may be transmitted in any suitable manner.

FIG. 5A, FIG. 5B, and FIG. 5C also depict a sensed variable 520. The sensed variable 520 may be an input of the MD 510, an output of the MD 510, an internal signal relating to some function or operation of the MD 510, or any combination of input, output, and internal signal. For example, an electrical current entering the refrigerator 116 (depicted in FIG. 1A) may be considered an input of refrigerator 116. The sensed variable 520 (in this example, amperage) may be sensed by sensor 530 and transmitted using transmitter 532. As another example, an air temperature in the freezer of the refrigerator 116 may be considered an output of refrigerator 116. The sensed variable 520 (in this example, temperature) may be sensed by sensor 530 and transmitted using transmitter 532. As another example, a pressure in the compressor of the refrigerator 116 may be considered an internal signal of the refrigerator 116. The sensed variable 520 (in this example, pounds per square inch) may be sensed by sensor 530 and transmitted using transmitter 532.

The sensed variable 520 may be any characteristic that is measurable with a sensor. A non-exclusive list of examples includes power consumption, temperature, water level, smoke level, $CO_2$ level, visibility level, vibration level, etc.

FIG. 5A generally illustrates an arrangement 500A in which the sensor 530A is included in the MD 510A. According to one possible implementation, the sensor 530A is physically incorporated into the MD 510A. For example, the MD 510A and sensor 530A may share a power supply. As another example, the sensor values measured by the sensor 530A (e.g., a freezer air temperature of the refrigerator 116) may be used for purposes other than transmission via the transmitter 532 (e.g., as part of a thermostatic feedback mechanism through which the refrigerator regulates the temperature of the freezer). In some implementations, the MD 510A is an IoE device configured to transmit sensor values via transmitter 532 to an IoE management device such as, for example, the supervisor 130 depicted in FIG. 1B and FIG. 1D, or the IoE SuperAgent 140 depicted in FIG. 1C and 1E.

FIG. 5B generally illustrates an arrangement 500B in which the sensor 530B is arranged externally from the MD 510B, but is configured to directly measure the sensed variable 520. In some implementations, the MD 510B is a legacy device which is not configured to transmit sensor values to an IoE management device. However, in the arrangement 500B, the sensor 530B is configured to measure the sensed variable 520 despite the fact that the sensor 530B is not incorporated in the MD 510B. As an example, the sensor 530B may comprise a plug that couples the refrigerator 116 to a wall outlet and measures the electrical current passing through the plug. As another example, the sensor 530B may comprise an IoE thermometer that is placed inside the freezer of the refrigerator 116 and transmits air temperature information via transmitter 532. In the arrangement of FIG. 5B, the sensor may be described as retrofitted to the MD 510B, or complementary to the 510B.

FIG. 5C generally illustrates an arrangement 500C in which the sensor 530C is arranged externally from the MD 510C, and is not configured to directly measure the sensed variable 520. Instead, the sensor 530C measures some other variable that relates indirectly to the sensed variable 520. As an example, the sensor 530C may comprise an environmental sensor that measures some characteristic of the environment of the MD 510C. For example, the kitchen in which the refrigerator 116 is located may comprise an IoE ambient noise sensor, IoE kitchen temperature sensor, etc. As another example, the building that includes the refrigerator 116 may comprise an IoE circuit breaker that measures the electrical current passing through the kitchen and estimates the electrical current passing to the refrigerator 116. As yet another example, the sensor 530C may be incorporated into a peripheral device such as, for example, an IoE microwave located in the same kitchen that includes that refrigerator 116. As yet another example, the sensor 530C may be retrofitted or complementary to a legacy microwave located in the same kitchen that includes that refrigerator 116.

Figure 6:
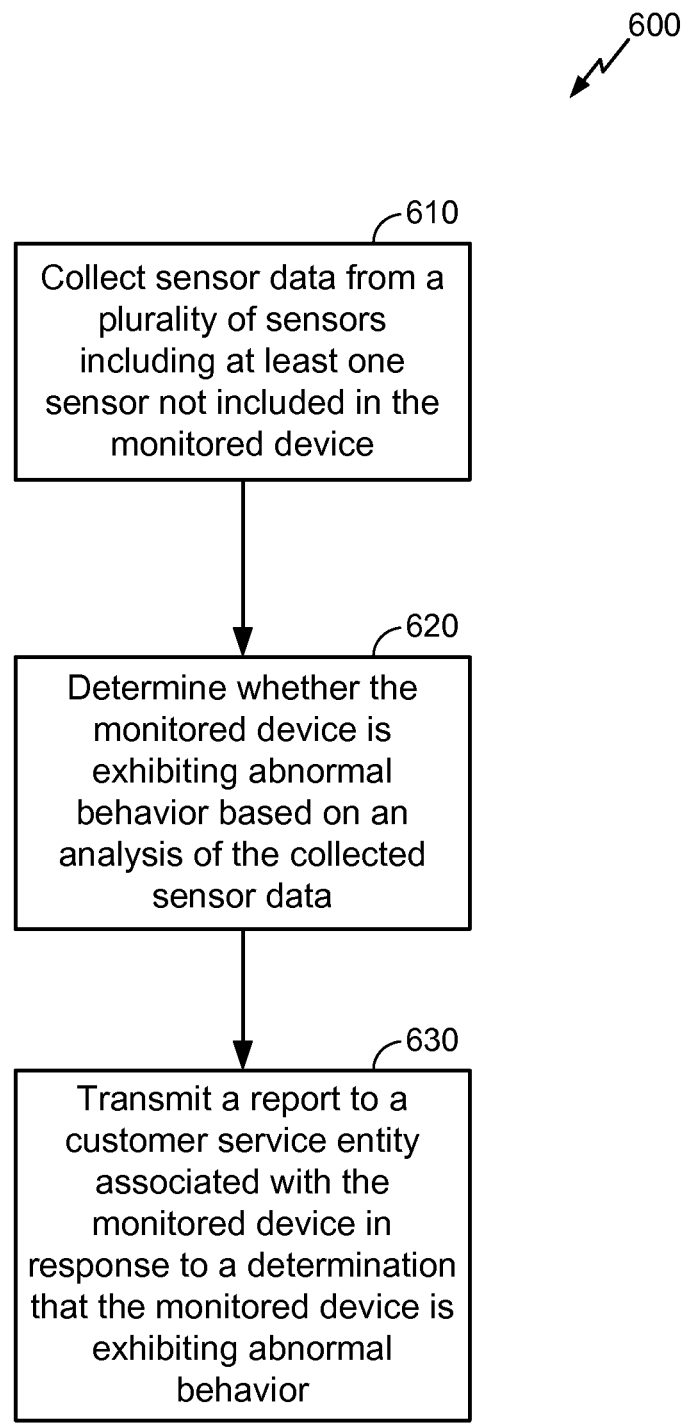
FIG. 6 illustrates a method for an IoE management device to automate customer service for a MD, according to an aspect of the disclosure.

FIG. 6 generally illustrates a method 600 for an IoE management device to automate customer service for a monitored device (MD). The IoE management device may comprise or be included in, for example, the supervisor 130 depicted in FIG. 1B and FIG. 1D, or the IoE SuperAgent 140 depicted in FIG. 1C and 1E.

The MD may comprise, for example, any of the IoE devices 110-118 depicted in FIG. 1A, IoE device 200A depicted in FIG. 2A, or IoE device 200B depicted in FIG. 2B. The MD may also take the form of the arrangement 500A of FIG. 5A, the arrangement 500B of FIG. 5B, or the arrangement 500C of FIG. 5C.

At 610, the IoE management device collects sensor data from a plurality of sensors, wherein the plurality of sensors comprises a first sensor that is not included in the MD. As an example, the first sensor may comprise the sensor 530B and the MD may comprise the MD 510B, as depicted in FIG. 5B. As another example, the first sensor may comprise the sensor 530C and the MD may comprise the MD 510C, as depicted in FIG. 5C. The first sensor that is not included in the MD may comprise a peripheral device sensor that is included in a peripheral device, an environmental sensor associated with the environment of the MD, a legacy device sensor associated with a legacy device, or a management device sensor associated with the management device.

The plurality of sensors may include additional sensors, for example, a monitored device sensor that is included in the MD itself. As an example, one or more of the additional sensors may be included in the MD, just as the sensor 530A depicted in FIG. 5A is included in the MD 510A. The plurality of sensors may further include any sensor, in any quantity, of the sensors described in the present disclosure.

In some implementations, the sensor data collected at 610 is stored. The sensor data may be organized in any suitable manner, for example, in a time series. The sensor data may be compressed. The collection at 610 may be intermittent (for example, periodic). Additionally or alternatively, the collection at 610 is initiated by the IoE management device in response to other considerations, as set forth elsewhere in the disclosure.

At 620, the IoE management device determines whether the MD is exhibiting abnormal behavior based on an analysis of the collected sensor data. In some implementations, the IoE management device obtains information relating to proper behavior of the MD and derives expected values for various sensor data relating to the MD. The IoE management device then analyzes the collected sensor data to determine if it matches the derived expected values. The IoE management device may derive the expected values based on information provided by the MD itself or provided by the manufacturer of the MD.

Additionally or alternatively, the IoE management device may derive the expected values from past performance of the MD. In other words, the IoE management device may determine a first range of sensor values, wherein the sensor data associated with the MD includes sensor values that are within the first range of sensor values when the MD is behaving normally. Additionally or alternatively, the IoE management device may determine a second range of sensor value, wherein the sensor data associated with the MD includes sensor values that are within the second range of sensor values when the MD is behaving abnormally. The first range and second range may non-overlapping. In some implementations, the IoE management device may utilize user feedback to determine whether the MD is behaving normally or abnormally.

At 630, the IoE management device transmits a report to a customer service entity associated with the MD in response to a determination that the MD is exhibiting abnormal behavior. As noted above, the IoE management device may determine that the MD is behaving abnormally if the sensor data associated with the MD includes sensor values that are not within a first range of sensor values associated with normal behavior, or alternatively, are within a second range of sensor values associated with abnormal behavior. In some implementations, the report includes the sensor data collected at 610. The report may include all the sensor data collected at 610 or a portion of the sensor data collected at 610, for example, the portion of the sensor data that was determined at 620 to be an indicator of abnormal behavior.

Additionally or alternatively, the report may include analysis data generated during the determining at 620. The analysis data may include data relating to the assumptions on which the determinations of 620 were made, for example, data indicating the second range of sensor values indicating abnormal behavior. Additionally or alternatively, the report may include sensor usage data, for example, make and model of the sensor, location of the sensor, sensor calibration data, etc.

The IoE management device may transmit the report at 630 in accordance with a report protocol identified by the MD itself, or by the customer service entity associated with the MD. The report may be transmitted at 630 in any suitable manner, for example, over the internet 175 depicted in FIG. 1A.

In some implementations, the customer service entity and the owner and/or operator of the IoE management device can interact to troubleshoot the abnormality or solve the malfunction associated with the MD. For example, if the IoE management device is installed on the UE 300B depicted in FIG. 3, then the UE 300C can facilitate communication between the customer service entity and the owner and/or operator of the IoE management device.

Figure 7:
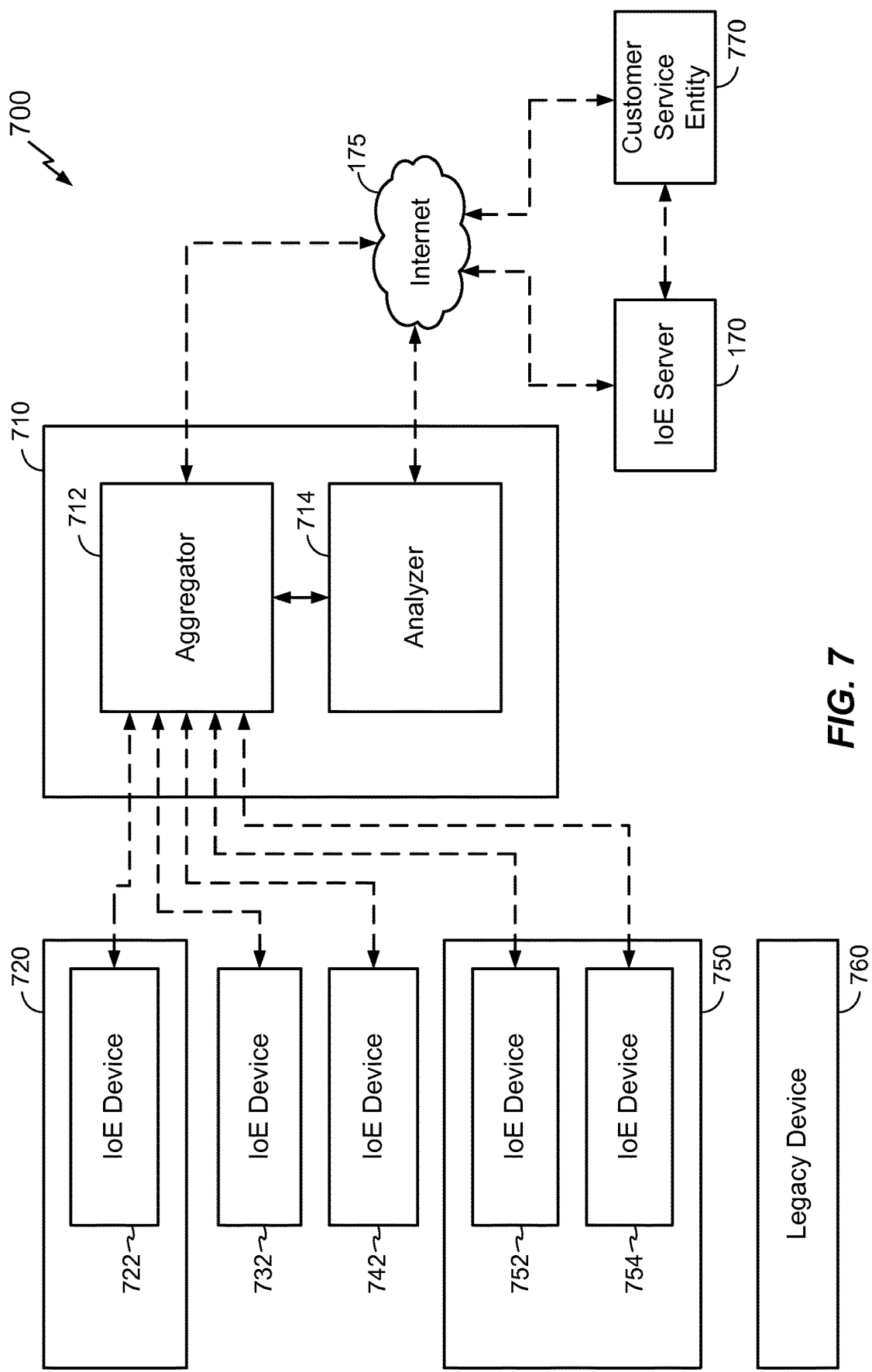
FIG. 7 illustrates an IoE management device for automate customer service for a MD, according to an aspect of the disclosure.

FIG. 7 generally illustrates an IoE environment 700 including an IoE management device 710. The IoE management device 710 may be included in, for example, the supervisor 130 depicted in FIGS. 1B and 1D, the Super-Agent 140 depicted in FIGS. 1C and 1E, UE 300A or UE 300B depicted in FIG. 3, and/or the communication device 400 depicted in FIG. 4. The IoE management device 710 includes an aggregator 712 and an analyzer 714. The functions performed by the aggregator 712 and analyzer 714 may be performed by, for example, one or more of the components of the platform 302 depicted in FIG. 3, i.e., transceiver 306, ASIC 308 or other processor, API 310, memory 312, and local database 314. Additionally or alternatively, the functions performed by the aggregator 712 and analyzer 714 may be performed by, for example, one or more of the components of the communication device 400 depicted in FIG. 4, i.e., logic configured to receive and/or transmit information 405, logic configured to process information 410, logic configured to store information 415, logic configured to present information 420, and logic configured to receive local user input 425.

The aggregator 712 receives signals from one or more IoE devices 722, 732, 742, 752, 754. The IoE devices 722, 732, 742, 752, 754 may be analogous to any of the IoE devices depicted in FIGS. 1A-1E or 2A-2B. The IoE devices 722, 732, 742, 752, 754 may include a sensor and transmitter such as the sensors 530A, 530B, 530C and transmitters 532 depicted in FIG. 5A-5C.

The IoE environment 700 comprises a first IoE-monitored device 720 that includes an IoE device 722. The IoE device 722 may comprise components analogous to, for example, the sensor 530A and transmitter 532 depicted in FIG. 5A. In some implementations, the IoE device 722 is incorporated into the first IoE-monitored device 720 in an arrangement that is similar to the arrangement 500A depicted in FIG. 5A.

The IoE environment 700 further comprises an IoE device 732. Unlike IoE device 722, IoE device 732 is not incorporated into an IoE-monitored device such as IoE-monitored device 722. The IoE device 732 may comprise components analogous to, for example, the sensor 530B and transmitter 532 depicted in FIG. 5B, or the sensor 530C and transmitter 532 depicted in FIG. 5C. In some implementations, the IoE device 732 may comprise an environmental sensor that measures some characteristic of the IoE environment 700.

The IoE environment 700 further comprises an IoE device 742 which is similar to IoE device 732. The IoE device 742 may measure some other characteristic of the IoE environment 700. Alternatively, the IoE device 742 may measure the same characteristic in a different portion of the IoE environment 700, or may supply redundant information for calibration purposes. Although two such IoE devices 732 and 742 are shown, it will be understood that fewer than two or more than two may be included. Moreover, either or both of the IoE devices 732, 742 may be omitted.

The IoE environment 700 further comprises a second IoE-monitored device 750 which is similar to first IoE-monitored device 720 except that the second IoE-monitored device 750 includes two IoE devices 752, 754. It will be understood that IoE-monitored devices such as first IoE-monitored device 720 and second IoE-monitored device 750 may include any number of IoE devices, each of which may comprise a sensor and transmitter similar to sensor 530A and transmitter 532. The sensor associated with the IoE device 752 may measure the same or different values than the sensor associated with the IoE device 754. Additionally, the IoE devices 752, 754 may share components, for example, the IoE device 752, 754 may include different sensors, but transmit sensor values using the same transmitter (e.g., transmitter 732).

The IoE environment 700 further comprises a legacy device 760. The legacy device 760 differs from the first IoE-monitored device 720 and second IoE-monitored device 750 in that the legacy device 760 does not contain an IoE device such as IoE devices 722, 752, 754. In some implementations, one or more IoE devices similar to IoE device 732 and 742 may complement the legacy device 760 (e.g., retrofitted to the legacy device 760), similar to the arrangement 500B depicted in FIG. 5B.

As noted previously in the description of the method 600 (depicted in FIG. 6), an aspect of the disclosure includes automating customer service for a MD. In some implementations, the method 600 could be performed by the IoE management device 710 depicted in FIG. 7. The MD for which customer service is automated could comprise any of the first IoE-monitored device 720, second IoE-monitored device 750, or legacy device 760 depicted in FIG. 7.

In such an implementation, the IoE management device 710 would collect sensor data (at 610) from a plurality of sensors, including at least one sensor not included in a MD. If the IoE management device 710 were automating customer service for the first IoE-monitored device 720, then the IoE management device 710 would collect sensor data (at 610) from at least one sensor not included in the first IoE-monitored device 720 (e.g., any of IoE devices 732, 742, 752, 754). If the IoE management device 710 were automating customer service for the second IoE-monitored device 750, then the IoE management device 710 would collect sensor data (at 610) from at least one sensor not included in the second IoE-monitored device 750 (e.g., any of IoE devices 722, 732, or 742). If the IoE management device 710 were automating customer service for the legacy device 760, then the IoE management device 710 would collect sensor data (at 610) from at least one sensor not included in the legacy device 760 (e.g., any of the IoE devices 722, 732, 742, 752, 754 depicted in FIG. 7).

The analysis referred to at 620 of the method 600 would determine whether the monitored device is exhibiting abnormal behavior based on, at least, the at least one sensor not included in the MD. However, the determination at 620 could be based on any collected sensor data, including sensor data that is collected from a sensor which is included in the MD itself. For example, if the MD were the second IoE-monitored device 750, then the IoE management device 710 might collect sensor data at 610 from IoE device 732 (not included in the MD), as well as any of the other IoE devices, including one or more of IoE device 752 and IoE device 754 (which are included in the MD). Moreover, in this example, the determination at 620 could be based on the sensor data collected from each of the IoE devices 732, 752, and 754.

Returning to FIG. 7, the aggregator 712 may collect sensor data from each of the IoE devices 722, 732, 742, 752, 754 in the IoE environment 700 depicted in FIG. 7. In some implementations, the aggregator 712 receives sensor data from multiple IoE devices 722, 732, 742, 752, 754 and determines which, if any, of the sensor data is relevant to a particular MD. For example, if the IoE management device 710 is managing the first IoE-monitored device 720, then the sensor data received from IoE device 722 is likely to be relevant to the behavior of the first IoE-monitored device 720. Moreover, sensor data from other IoE devices 732, 742, 752, 754 may also be relevant or not relevant, depending on the particular circumstances. For example, the sensor data from the IoE devices 732 and 752 may be relevant, while the sensor data from the IoE device 742 and 754 may not be relevant. The aggregator 712 may aggregate the relevant sensor data (sensor data from IoE devices 722, 732, 752 in the previous example) into an aggregated MD data set that is tailored to the management of the first IoE-monitored device 720. The aggregated MD data set for the first IoE-monitored device 720 may omit sensor data from IoE devices that do not supply relevant sensor data (IoE device 742, 754 in the previous example).

Additionally or alternatively, the aggregator 712 may collect local data from the Internet 175, the IoE server 170, or the customer service entity 770 depicted in FIG. 7. The local data may be determined to be relevant in the same manner that sensor data collected from the IoE devices 722, 732, 742, 752, 754 is determined to be relevant. The local data may be collected from the Internet 175, the IoE server 170, or the customer service entity 770 in the same manner that sensor data is collected from the IoE devices 722, 732, 742, 752, 754. For example, IoE 732 may be an ambient temperature sensor located inside a home legacy device 760 may be a thermostat located inside the home. Because the thermostat is a legacy device, the thermostat cannot send IoE-related transmissions to the IoE management device 710. However, the IoE management device 710 can determine that the heat is on in the house if, for example, it collects sensor data from the IoE device 732 (ambient temperature sensor) indicating that the temperature inside the house is 70 degrees Fahrenheit and also collect local data from, for example, the Internet 175, that the outdoor temperature is 35 degrees Fahrenheit. Accordingly, the local data collected from the Internet 175, etc., may be determined to be relevant by the aggregator 712 and also included in an aggregated MD data set generated by the aggregator 712 (for example, an aggregated MD data set associated with legacy device 260).

Another example of local data that can be collected from the Internet 175, the IoE server 170, or the customer service entity customer service entity 770 is the current price or availability of power or some other resource.

The aggregator 712 may determine whether sensor data from a particular IoE device is relevant in any suitable manner. In some implementations, the aggregator 712 receives relevancy data that identifies one or more relevant sensors, sensor types, sensor data types, or IoE devices. The relevancy data may be receives from any entity that is capable of supplying relevancy data.

In some implementations, an IoE device can transmit different types of relevancy data. First, the IoE device can identify sensor data that will be supplied by the IoE device and is relevant to the behavior of the MD in which the IoE device is included. Second, the IoE device can identify sensor data that cannot be supplied by the IoE device itself but may nevertheless be relevant to the behavior of the MD in which the IoE device is included. And third, the IoE device can identify sensor data that can be supplied by the IoE device that is relevant to the behavior of other MDs that the IoE management device 710 is managing (e.g., by identifying specific MDs or MD types for which relevant sensor data can be transmitted, or by simply identifying the sensor data or sensor data types that can be supplied, thereby enabling the IoE management device 710 to match the supplied sensor data to other MDs that the IoE management device 710 is managing).

For example, if the second IoE-monitored device 750 is a microwave that is managed by the IoE management device 710, then the second IoE-monitored device 750 may supply three types of relevancy data. First, the second IoE-monitored device 750 may identify IoE device 752, 754 as suppliers of sensor data (e.g., microwave power usage, microwave oven temperature) that is relevant to the behavior of the second IoE-monitored device 750. Second, the second IoE-monitored device 750 may identify kitchen ambient temperature as a type of sensor data that is relevant to the behavior of the second IoE-monitored device 750. Third, the second IoE-monitored device 750 may identify the sensor data supplied by IoE device 752 (microwave power usage) as potentially relevant to, for example, other nearby kitchen appliances (e.g., refrigerator, dishwasher, etc.).

Based on these three types of relevancy data, the aggregator 712 will be able to determine the following. First, that the aggregated MD data set associated with the second IoE-monitored device 750 (microwave) should include sensor data transmitted from the IoE devices 752, 754 (microwave power usage, microwave oven temperature). Second, that the aggregated MD data set associated with the second IoE-monitored device 750 (the microwave) should further include kitchen ambient temperature sensor data supplied by IoE device 732 (e.g., a thermostat located in the kitchen). And third, that the sensor data transmitted from the IoE device 752 (microwave power usage) should be aggregated into the aggregated MD data sets associated with other kitchen appliances being managed by the IoE management device 710 (for example, a first IoE-monitored device 720 that is a refrigerator, and a legacy device 760 that is a dishwasher).

In some implementations, the IoE management device 710 will maintain individual aggregated MD data sets for each MD in the IoE environment 700. Each individual aggregated MD data set may include relevant sensor data from any or all of the IoE devices in the IoE environment 700, and the sensor data from an individual IoE device can be aggregated into the aggregated MD data set of any or all of the MDs in the IoE environment.

The relevancy data may be obtained from any entity capable of providing it. For example, if the IoE management device 710 is provided on the UE 300B depicted in FIG. 3 (e.g., a smartphone), then the user of the smartphone may obtain it manually. For example, the user may indicate via a user interface of the smartphone that a legacy device legacy device 760 (for example, an oven having a particular make and model), is located in the kitchen. The IoE management device 710 may then obtain relevancy data for the particular make and model of the oven identified by the user of the smartphone from, for example, a remote server such as IoE server 170, or the Internet 175.

In another example, the relevancy data transmitted by a given IoE device may simply identify the IoE device itself and/or the MD in which the IoE device is included. The IoE management device 710 may then obtain additional relevancy data (e.g., the three types of relevancy data described elsewhere in the disclosure) from IoE server 170, or the Internet 175.

The IoE management device 710 may update or reevaluate relevancy data at any time. For example, the IoE management device 710 may intermittently (e.g., periodically) request relevancy data, or updates to the relevancy data, from the IoE devices 722, 732, 742, 752, 754, the IoE server 170, or the Internet 175. Additionally or alternatively, the IoE management device 710 may update or reevaluate relevancy data each time that a new IoE device or MD is added or removed from the IoE environment 700.

Finally, the relevancy data may be obtained from the analyzer 714. As will be described in greater detail elsewhere in the disclosure, the analyzer 714 may determine whether a given MD is exhibiting abnormal behavior based on an analysis of the collected sensor data (e.g., an aggregated MD data set associated with the given MD). However, in some implementations, the analyzer 714 may additionally perform a determination as to whether there is any correlative or causative relationship between the behavior of the given MD and sensor data that is not included in the aggregated MD data set associated with the given MD. In other words, the analyzer 714 may determine that certain sensor data (previously considered not relevant and thus excluded from the aggregated MD data set) is in fact relevant and should be included in future aggregated MD data sets. The analyzer 714 can then transmit relevancy data to the aggregator 712 indicating that the sensor data should be included in future aggregated MD data sets.

The aggregator 712 may also send commands to the IoE devices 722, 732, 742, 752, 754. For example, the aggregator 712 may reevaluate the relevancy of the sensor data transmitted by IoE device 732 and determine that the sampling frequency of the sensor should be increased or decreased. Additionally or alternatively, the analyzer 714 may request that the aggregator 712 obtain sensor data from a specific IoE device in response to one or more determinations made by the analyzer 714. In this example, the specific IoE device may be in an inactive mode until prompted by the aggregator 712 to generate and transmit sensor data.

Additionally or alternatively, the aggregator 712 may provide commands that indicate the circumstances under which a given IoE device is to collect sensor data. For example, in some implementations, an IoE device such as IoE device 742 may comprise an ambient temperature sensor that is incorporated into a smartphone (e.g., the UE 300B depicted in FIG. 3). The IoE management device 710 may determine that when the smartphone is located in the kitchen, it can supply sensor data that indicates the kitchen ambient temperature. As a result, the IoE management device 710 can transmit a command that the smartphone to collect and supply ambient temperature data in response to a determination that the smartphone is located in the kitchen. The determination that the smartphone is located in the kitchen may be made by the IoE management device 710, the smartphone, or both devices.

Additionally or alternatively, the aggregator 712 may supply data logs to an external recipient, for example, a server associated with a customer service entity, or the IoE server 170 depicted in FIG. 1A-1E. In some implementations, the data log is an environmental data log that includes all of the data collected by the aggregator 712. In some implementations, the data log is a MD data log that includes all of the data determined to be relevant to a particular MD, i.e., all of the data included in the aggregated MD data set associated with the particular MD. In either case, the data log may be made anonymous by converting the sensor data into anonymous sensor data. According to one example, the aggregator 712 intermittently (e.g., periodically) converts an aggregated MD data set associated with first IoE-monitored device 720 (e.g., a refrigerator) into an anonymous MD data log. After converting the aggregated MD data set, the aggregator 712 then transmits the anonymous MD data log to a customer service entity associated with the first IoE-monitored device 720 (e.g., the manufacturer of the refrigerator). The refrigerator manufacturer can use the anonymous MD data log to improve or fine-tune the customer service associated with the refrigerator and/or improve or fine-tune the design of future refrigerators. According to another example, the aggregator 712 anonymizes and transmits an environmental data log to the customer service entity, which the customer service entity then uses to reevaluate relevancy and/or update relevancy data. Finally, the customer service entity can use a data log (environmental or MD-specific, anonymous or otherwise) to reevaluate and/or update behavioral data associated with the MD (described in detail elsewhere in the present disclosure).

The analyzer 714 receives an aggregated MD data set from the aggregator 712, as depicted in FIG. 7. Based on the aggregated MD data set, the analyzer 714 can determine whether the MD is exhibiting normal or abnormal behavior. In some implementations, the analyzer 714 analyzes the aggregated MD data set based on behavioral data associated with the MD. The analyzer 714 then determines whether the MD is exhibiting normal behavior based on the analysis. Additionally or alternatively, the analyzer 714 determines whether the MD is exhibiting abnormal behavior based on the analysis.

The analyzer 714 requests and/or receives behavioral data from any suitable source and in any suitable manner. The behavioral data may be associated with a specific MD, and may include any data that enables the analyzer 714 to recognize, based on the aggregated MD data set supplied by the aggregator 712, whether the specific MD is behaving normally and/or abnormally. The behavioral data requested and/or received by the analyzer 714 may be requested and/or received in the same manner in which the relevancy data is requested and/or received by the aggregator 712.

The behavioral data used by the analyzer 714 may include ranges of sensor values that indicate normal and/or abnormal behavior. For example, FIG. 11 and FIG. 12, which are described in detail elsewhere in the present disclosure, depict two specific analyses which can be performed by the analyzer 714.

If the analyzer 714 determines that a specific MD is behaving normally and/or abnormally, it may transmit a report to a customer service entity 770, as set forth at 630 depicted in FIG. 6. Additionally or alternatively, the analyzer 714 may send the report to an IoE server 170. The IoE server 170 may store the report and maintain it in memory, thereby preserving it for record-keeping purposes. Additionally or alternatively, the IoE server 170 may forward the report to the owner or operator of the IoE management device 710 and/or MD, a third-party consumer protection entity or a third-party public quality report entity.

In some implementations, the analyzer 714 generates its own behavioral data by analyzing the aggregated MD data set and/or other available data. The normality or abnormality of certain sensor data patterns can be learned over time based on usage patterns and/or the responses (if any) to the reports that are generated. For example, if multiple reports are periodically sent to the owner or operator of the IoE management device 710 and/or MD or the customer service entity 770, and there is no detectable response or change in the behavior of the MD, then the analyzer 714 may generate new behavioral data relating to the MD, i.e., the analyzer 714 may learn that abnormal behavior should be reclassified as normal behavior and generate behavioral data to that effect.

Just as the aggregator 712 anonymizes data logs, the analyzer 714 may also anonymize the reports. However, in some implementations, the report will prompt the customer service entity to respond with consumer-specific assistance, in which case the report will include an identification of the MD, the IoE management device 710, the owner or operator of the MD or IoE management device 710, or a UE associated with the owner or operator of the MD or IoE management device 710. If, on the other hand, the report is anonymized, then the report will be converted into a format wherein none of the foregoing information is indicated in the report.

Figure 8:
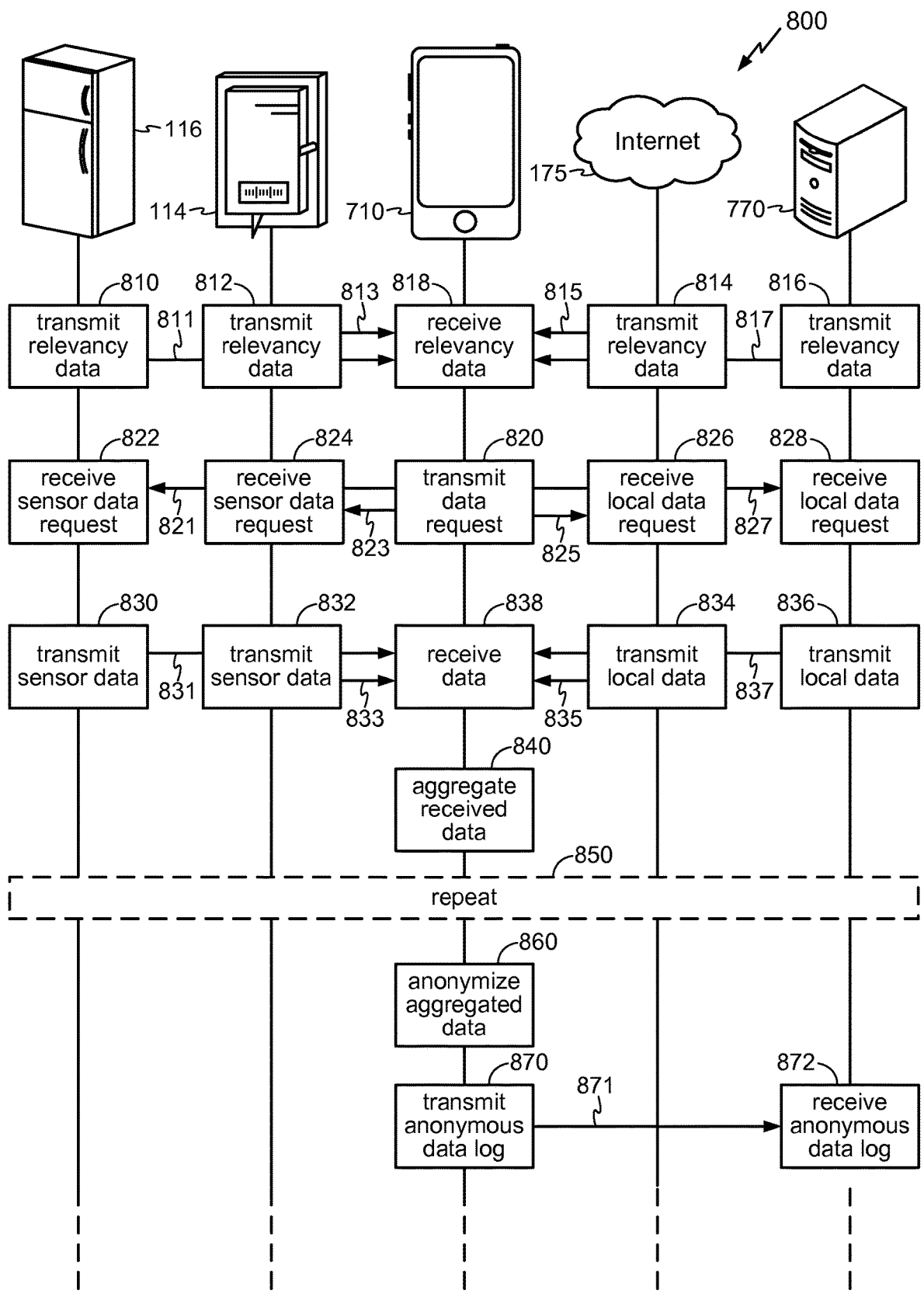
FIG. 8 illustrates a signal flow diagram for generating and transmitting an anonymous data log in accordance with an aspect of the disclosure.
Figure 9:
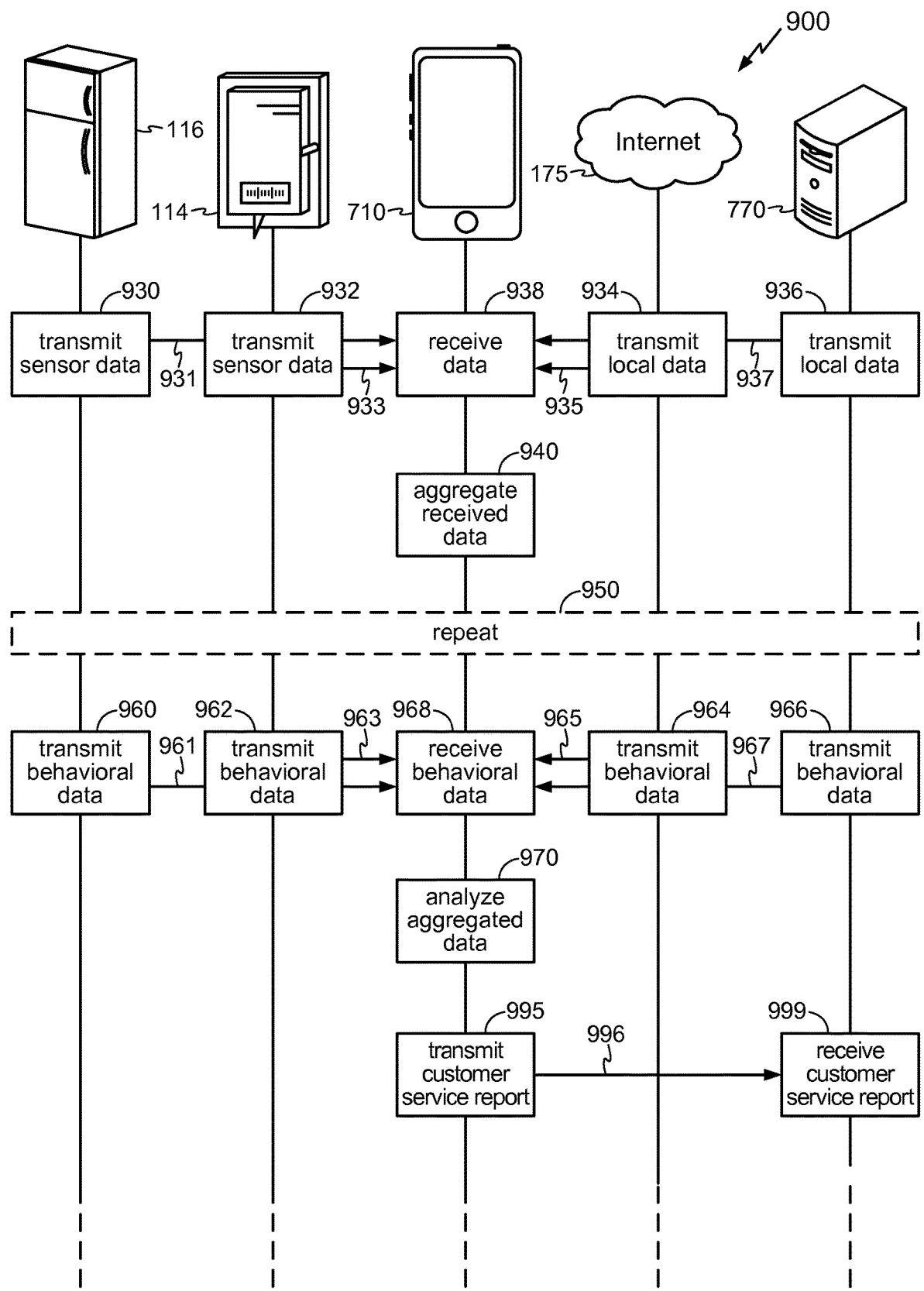
FIG. 9 illustrates a signal flow diagram for generating and transmitting a customer service report in accordance with an aspect of the disclosure.
Figure 10:
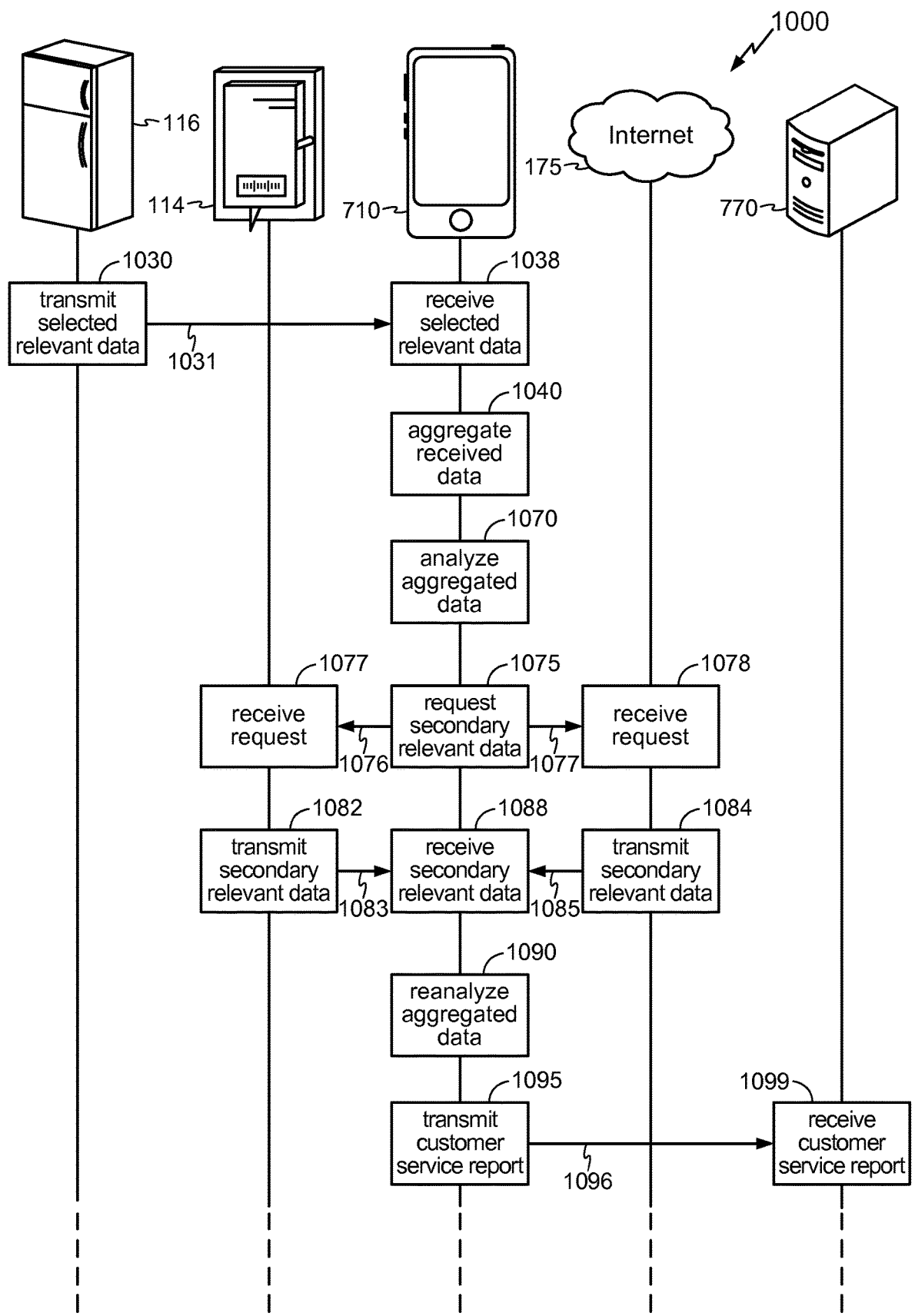
FIG. 10 illustrates a signal flow diagram for generating and transmitting a customer service report in accordance with another aspect of the disclosure.

FIG. 8, FIG. 9, and FIG. 10 generally illustrate signal flow diagrams 800, 900, 1000 that depict the interactions between devices within or related to a specific IoE environment, for example, the IoE environment 700 depicted in FIG. 7. Each of the signal flow diagrams 800, 900, 1000 depict a refrigerator 116, a thermostat 114, and Internet 175, as depicted in FIGS. 1A-1E. The refrigerator 116 represents a MD such as, for example, first IoE-monitored device 720 or second IoE-monitored device 750 depicted in FIG. 7. The thermostat 114 represents an IoE device such as, for example, IoE device 732 or IoE device 742 depicted in FIG. 7. The refrigerator 116 and thermostat 114 depicted in signal flow diagrams 800, 900, 1000 share an IoE environment 700 with the IoE management device 710. In FIG. 8, FIG. 9, and FIG. 10, the IoE management device 710 is depicted as a smartphone such as UE 300B depicted in FIG. 3. As noted elsewhere in the disclosure, the IoE management device 710 may be implemented using various components of the supervisor 130, UE 300B, communication device 400, etc.

FIG. 8, FIG. 9, and FIG. 10 also depict the customer service entity 770 of FIG. 7. It will be understood that although the customer service entity 770 is depicted as a server, transmissions to and from the customer service entity 770 may take any suitable form. Moreover, although transmissions to and from the customer service entity customer service entity 770 are depicted as distinct from transmissions to and from the Internet 175, it will be understood that the Internet 175 may serve as a relay for transmissions between the IoE management device 710 and the customer service entity 770.

FIG. 8 generally illustrates a signal flow diagram 800 for generating and transmitting an anonymous data log in accordance with an aspect of the disclosure. At 810, 812, 814, 816, each of refrigerator 116, thermostat 114, Internet 175, and customer service entity 770 transmits relevancy data to the IoE management device 710. The transmissions at 810, 812, 814, 816 may be responsive to, for example, a request for such data (not shown). At 818, the IoE management device 710 receives relevancy data 811, 813, 815, 817 resulting from each of the transmissions 810, 812, 814, 816, respectively. The reception 818 of each of the respective transmissions 810, 812, 814, 816 is simultaneous as depicted in FIG. 8, but it will be understood that the timing shown in FIG. 8 is exemplary, and that each of the respective transmissions 810, 812, 814, 816 may be received at 818 in any order, or not received at all.

At 820, the IoE management device 710 transmits one or more data requests. The IoE management device 710 may determine which entities to which the one or more data requests will be transmitted (based on the relevancy data 811, 813, 815, 817 received at 818). In FIG. 8, the IoE management device 710 transmits sensor data requests 821, 823 to the refrigerator 116 and thermostat 114, respectively, and transmits local data requests 825, 827 to the Internet 175 and customer service entity 770, respectively. The data requests are received 822, 824, 826, 828 at the refrigerator 116, thermostat 114, Internet 175, and customer service entity 770, respectively. It will be understood that although four data requests 821, 823, 825, 827 are depicted in FIG. 8, that more or fewer data requests are within the scope of the present disclosure.

At 830, 832, 834, 836, one or more of entities that receives a data request at 822, 824, 826, 828 transmits data to the IoE management device 710. At 838, the IoE management device 710 receives sensor data 831, 833 from refrigerator 116 and thermostat 114, respectively, and receives local data 835, 837 from Internet 175 and customer service entity 770, respectively. The reception 838 of each of the respective transmissions 831, 833, 835, 837 is simultaneous as depicted in FIG. 8, but it will be understood that the timing shown in FIG. 8 is exemplary, and that each of the respective transmissions 831, 833, 835, 837 may be received at 838 in any order, or not received at all. Moreover, each of the transmissions 831, 833, 835, 837 may be responsive to the respective data requests 821, 823, 825, 827 sent at 820.

At 840, the IoE management device 710 aggregates the data received at 838. As noted elsewhere in the present disclosure, the aggregation at 838 may result in an aggregated MD data set associated with each MD being managed by the IoE management device 710. For example, if the aggregator 712 of the IoE management device 710 determines that sensor data 831 and sensor data 833 is relevant to the behavior of the refrigerator 116, then the sensor data 831, 833 will be aggregated into an aggregated MD data set associated with the refrigerator 116. Additionally or alternatively, the aggregator 712 may determine that sensor data 833 and local data 835 are relevant to the behavior of thermostat 114 and generator an aggregated MD data set associated with the thermostat 114.

At 850, the IoE management device 710 optionally repeats one or more of 818, 820, and 838, and the other entities respond (or don't respond) as necessary. In this manner, the quantity of data associated with the aggregated MD data sets generated by the aggregator 712 may build up over time. For example, the sensor data 833 may be received periodically at 838 and aggregated into an aggregated MD data set associated with the thermostat 114. Additionally or alternatively, the periodically received sensor data 833 may be aggregated into a universal data set associated with the 700 in which the thermostat 114 is included.

At 860, the IoE management device 710 anonymizes the data that is aggregated at 840 and/or repeatedly aggregated at 850. At 870, the IoE management device 710 transmits an anonymous data log 871 to the customer service entity 770. At 872, the customer service entity 770 receives the anonymous data log 871. It will be understood that the signal flow diagram 800 is presented as an example. In other implementations, the anonymizing at 860 is omitted. Moreover, the data log sent at 870 may be environment-specific or MD-specific, and may be sent, via the Internet 175, to an entity other than the customer service entity 770.

FIG. 9 generally illustrates a signal flow diagram 900 for generating and transmitting a customer service report in accordance with an aspect of the disclosure. The reception at 938, aggregation at 940, and repetition at 950 is analogous to the reception at 838, aggregation at 840, and repetition at 850 described in detail elsewhere in the disclosure. Moreover, the transmissions 930, 932, 934, 936 and data 931, 933, 935, 937 are analogous to the transmissions 830, 832, 834, 836 and data 831, 833, 835, 837 described in detail elsewhere in the disclosure.

At 960, 962, 964, 966, each of refrigerator 116, thermostat 114, Internet 175, and customer service entity 770 transmits behavioral data to the IoE management device 710. The transmissions at 960, 962, 964, 966 may be responsive to, for example, a request for such data (not shown). At 968, the IoE management device 710 receives behavioral data 961, 963, 965, 967 resulting from each of the transmissions 960, 962, 964, 966, respectively. The behavior data reception 968 of each of the respective transmissions 960, 962, 964, 966 is simultaneous as depicted in FIG. 9, but it will be understood that the timing shown in FIG. 9 is exemplary, and that each of the respective transmissions 960, 962, 964, 966 may be received at 968 in any order, or not received at all. Moreover, as shown in FIG. 9, the behavior data reception 968 of each of the respective transmissions 960, 962, 964, 966 is subsequent to the data reception at 938, aggregation at 940, and repetition at 950, but it will be understood that the behavior data reception 968 may be performed during or prior to any or all of the data reception at 938, aggregation at 940, and repetition at 950. For example, the behavior data reception 968 depicted in FIG. 9 and the relevancy data reception 818 depicted in FIG. 8 may occur simultaneously at the same IoE management device 710, which generates and transmits anonymous data logs as well as customer service reports.

At 970, the analyzer 714 included in the IoE management device 710 analyzes the data aggregated at 940 and/or repeatedly aggregated at 950. As noted elsewhere in the present disclosure, the analyzer 714 may analyze, for example, an aggregated MD data set (generated at 938, 940, 950) based on received behavioral data. Accordingly, the IoE management device 710 may use the behavior data 961, 963, 965, 967 received at 968 to analyze the aggregated MD data set generated at 938, 940, 950. As noted elsewhere in the present disclosure, the analyzer 714 may also transmit at 995 a customer service report 996 to a customer service entity 770. At 999, the customer service entity 770 may receive the customer service report 996. It will be understood that the signal flow diagram 900 is presented as an example. In other implementations, the customer service report 996 is anonymized prior to transmission at 995. Moreover, the customer service report 996 sent at 995 may be environment-specific or MD-specific, and may be sent, via the Internet 175, to an entity other than the customer service entity 770.

FIG. 10 generally illustrates a signal flow diagram 1000 for generating and transmitting a customer service report in accordance with another aspect of the disclosure. The data reception at 1038, unlike the data reception at 838 and 938, is reception of selected relevant data. In the signal flow diagram 1000, the IoE management device 710 collects relevant data on an as-needed basis rather than all at once.

At 1030, the refrigerator 116 transmits sensor data 1031 to the IoE management device 710. As with the transmission at 830, the transmission may be responsive to a request (not shown in FIG. 10) analogous to the sensor data request 821 depicted in FIG. 8. Moreover, the transmission may be responsive to a determination by aggregator 712 that the sensor data 1031 is relevant (not shown in FIG. 10). This determination may be responsive to the reception of relevancy data analogous to the relevancy data reception 818 depicted in FIG. 8. However, unlike in FIG. 8, the IoE management device 710 depicted in signal flow diagram 1000 does not receive all the data that the IoE management device 710 determines to be relevant. Instead, it selects a portion of the relevant data (the sensor data 1031 in this example) and receives only the selected relevant data.

At 1040, the aggregator 712 of the IoE management device 710 aggregates the selected relevant data 1031 received at 1038. The aggregation at 1040 is analogous to the aggregation at 840 depicted in FIG. 8. However, as noted above, only selected relevant data is received at 1038. Accordingly, the aggregation 1040 differs from the aggregation 840 in that only selected relevant data is aggregated at 1040. The reception at 1038 and aggregation at 1040 may be repeated (not shown in FIG. 10) in a manner that is analogous to the repetition 850 depicted in FIG. 8.

At 1070, the analyzer 714 of the IoE management device 710 analyzes the selected relevant data aggregated at 1040. The analysis at 1070 is analogous to the analysis at 870 depicted in FIG. 8. However, as noted above, only selected relevant data is aggregated at 1040. Accordingly, the analysis 1070 differs from the analysis 870 in that only selected relevant data is analyzed at 1070.

At 1075, the IoE management device 710 transmits a secondary relevant data request 1076 to the thermostat 114. The transmission at 1075 may be responsive to a determination by the analyzer at 714 that further data is necessary to determine whether the MD is behaving normally and/or abnormally. For example, if the refrigerator 116 is the MD being managed by the IoE management device 710, then the aggregator 712 of the IoE management device 710 may request periodic updates on the power consumption associated with the refrigerator 116. The selected relevant sensor values associated with the power consumption of the refrigerator 116 are generated by the refrigerator 116 and transmitted (at 1030) to the IoE management device 710. The IoE management device 710 aggregates the selected relevant sensor values (at 1040) and analyzes the aggregated MD data set associated with the refrigerator 116 (at 1070).

For example, the IoE management device 710 may determine that the power consumption of the refrigerator is abnormally low for a sustained period of time. The analysis performed at 1070 sometimes indicates that abnormally low power consumption sometimes correlates with a malfunction of the refrigerator 116 (e.g., the temperature feedback mechanism inside the freezer is miscalibrated and therefore providing erroneous temperature measurements). This conclusion may be based on received behavioral data (not shown in FIG. 10) analogous to the reception of behavioral data at 968, depicted in FIG. 9. On the other hand, the behavioral data may further indicate that when the kitchen ambient temperature is abnormally low, the refrigerator 116 may exhibit low power consumption that is not the result of any malfunction associated with the refrigerator 116. The analysis performed at 1070 is therefore inconclusive in the sense that the power consumption of the refrigerator 116 is abnormally low, but a customer service report may not be necessary.

At 1075, the IoE management device 710 may request secondary relevant data. A request for secondary relevant data 1076 is sent to the thermostat 114 and received by the thermostat 114 at 1077. Additionally or alternatively, a request for secondary relevant data 1077 is sent to the Internet 175 and received by the Internet 175 at 1078. At 1082 and 1084, the thermostat 114 and the Internet 175, respectively, transmit the requested secondary relevant data 1083, 1085. The secondary relevant data 1083, 1085 is received by the IoE management device 710 at 1088. Returning to the previous example, the secondary relevant data 1083, 1085 may indicate that the thermostat 114 is off despite the fact that it is 35 degrees Fahrenheit outside the home. Moreover, the temperature inside the home has been between 30 and 40 degrees Fahrenheit for the past few days, suggesting that nobody has been home for the past few days (perhaps on vacation, with the heat turned off to save on the power bill).

At 1090, the IoE management device 710 reanalyzes the aggregated data. Prior to 1090, the secondary relevant data 1083, 1085 received has been aggregated (not shown in FIG. 10) into the aggregated MD data set associated with the refrigerator 116 in the same manner as in the aggregation 1040. Upon reanalyzing at 1090, the IoE management device 710 concludes that the power consumption associated with refrigerator 116, though abnormally low, is not indicative of a malfunction of the refrigerator 116. Instead, it is consuming less power because the temperature outside the refrigerator 116 is low, and less energy is required to maintain a low temperature inside the refrigerator 116. According to one scenario, no customer service report is sent in response to this determination. On the other hand, the IoE management device 710 may transmit (at 1095) a customer service report 1096 simply to report the details of its analysis, to be used by the customer service entity 770 to improve or fine tune the relevancy data or behavioral data that is supplies.

On the other hand, the secondary relevant data 1083, 1085 may indicate that the refrigerator 116 is in fact malfunctioning. In the event that the analyzer 714 determines at 1090 that the refrigerator 116 is behaving abnormally (e.g., consuming abnormally low amounts of power, despite normal kitchen temperatures outside the refrigerator), the IoE management device 710 transmits (at 1095) a customer service report 1096, which is received by the customer service entity 770 at 1099.

Additionally or alternatively, the IoE management device 710 may notify the owner or operator of the refrigerator 116 that an abnormality has been detected. If the IoE management device 710 is included in the UE 300B or the IoE device 200A, the notification may appear on a user interface thereof, for example, the display 305B or the display 226.

In FIG. 10, the selected relevant data 1031 is transmitted (at 1030) from the refrigerator 116. In some scenarios, therefore, the refrigerator 116 is similar to the first IoE-monitored device 720 or second IoE-monitored device 750 depicted in FIG. 7. In other words, the sensor that measures the selected relevant data 1031 is included in the MD, just as IoE device 822 is included in the first IoE-monitored device 720 and IoE devices 752, 754 are included in the second IoE-monitored device 750. This is an arrangement similar to the arrangement 500A depicted in FIG. 5A, where the sensor 530A is included in the MD 510A. However, it will be understood that other arrangements 500B, 500C are also possible. For example, the refrigerator 116 may be a legacy device such as legacy device 260 depicted in FIG. 7. The IoE device 732, for example, may be a plug that couples the refrigerator 116 to a wall outlet and measures the power consumption of the refrigerator 116 without being included in the refrigerator 116 itself. This is an arrangement similar to the arrangement 500B depicted in FIG. 5B.

Referring again to FIG. 10, the selected relevant data 1031 is received first (at 1038), and the secondary relevant data 1083, 1085 is received only after the selected relevant data 1031 is aggregated (at 1040) and analyzed (at 1070). In some implementations, the IoE management device 710 may perform in this manner for efficiency purposes. To return to the previous example, the IoE management device 710 analyzes the power consumption data first, and analyzes thermostat and weather data only after the power consumption data suggests the possibility of abnormal behavior. It will be understood that the order may be reversed. For example, if thermostat and weather data can be aggregated 1040 and/or analyzed 1070 more efficiently than the power consumption data, then the IoE management device 710 may analyze the thermostat and weather data first, and request the power consumption data only after the thermostat and weather data indicates that conditions are proper for analyzing the power consumption of the refrigerator 116.

Figure 11:
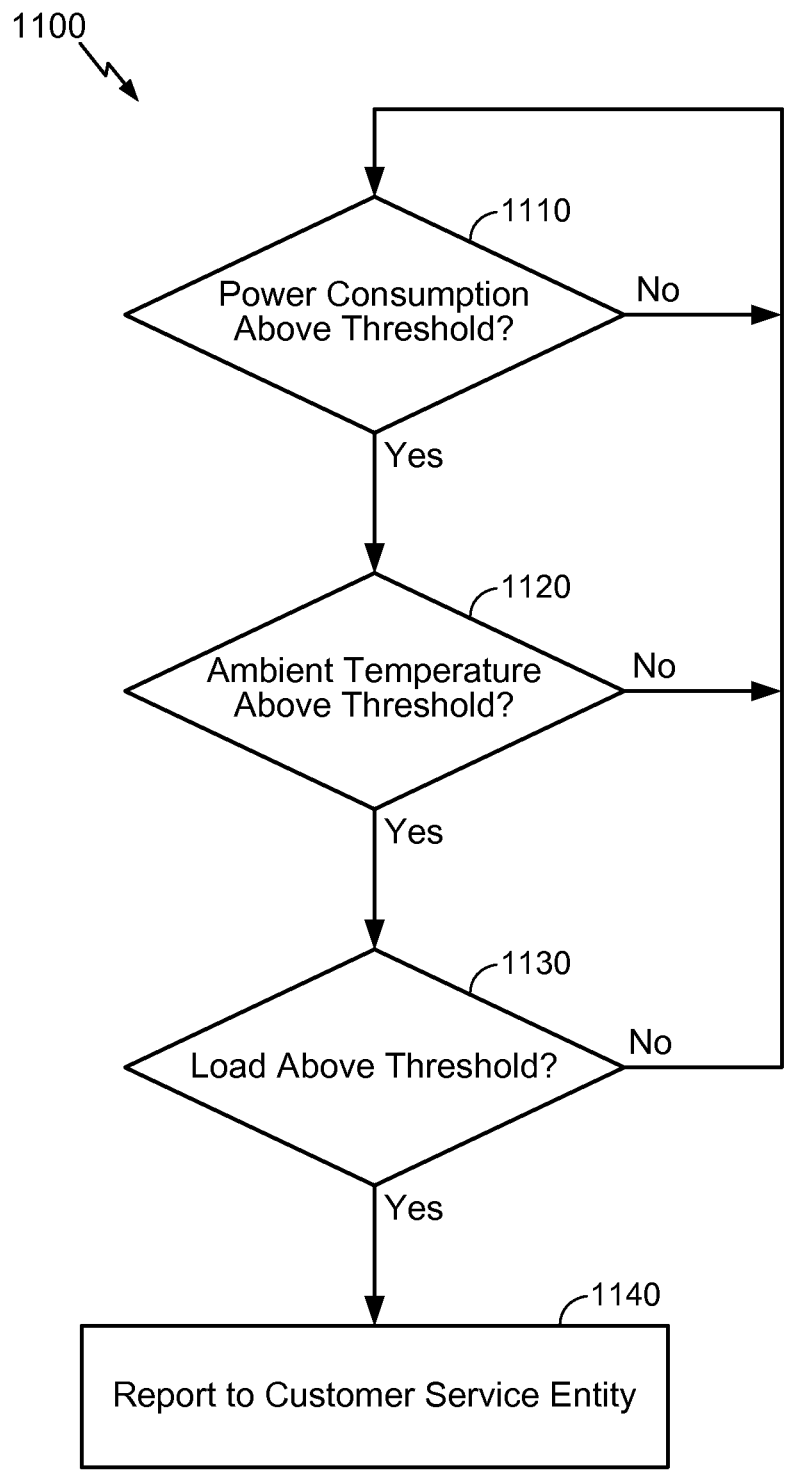
FIG. 11 illustrates an example of a method by which an IoE management device can manage a MD.

FIG. 11 generally illustrates an example of a method 1100 by which an IoE management device 710 can manage a MD, for example, the refrigerator 116.

At 1110, the IoE management device 710 determines if the power consumption of the refrigerator 116 is above a first threshold. The first threshold may define a first range of power consumption sensor values (sensor values below the first threshold) and a second range of power consumption sensor values (sensor values above the first threshold). It will be understood by a skilled artisan that a threshold may define two ranges and vice-versa, such that the terms may be used interchangeably. If the power consumption is determined not to be above the first threshold (i.e., within the first range of power consumption sensor values defined by the first threshold), the method 1100 cycles back to 1110. On the other hand, if the power consumption is determined to be below the first threshold (i.e., within the second range of power consumption sensor value defined by the first threshold), the method 1100 proceeds to 1120.

At 1120, the IoE management device 710 determines whether the ambient temperature is above a second threshold. If the ambient temperature is determined not to be above the second threshold, the method 1100 cycles back to 1110. On the other hand, if the power consumption is determined to be below the second threshold, the method 1100 proceeds to 1130.

At 1130, the IoE management device 710 determines whether the load is above a third threshold. If the load is determined not to be above the third threshold, the method 1100 cycles back to 1110. On the other hand, if the load is determined to be below the third threshold, the method 1100 proceeds to 1140.

At 1140, the IoE management device 710 sends a customer service report to a customer service entity, for example, the customer service entity 770.

Figure 12:
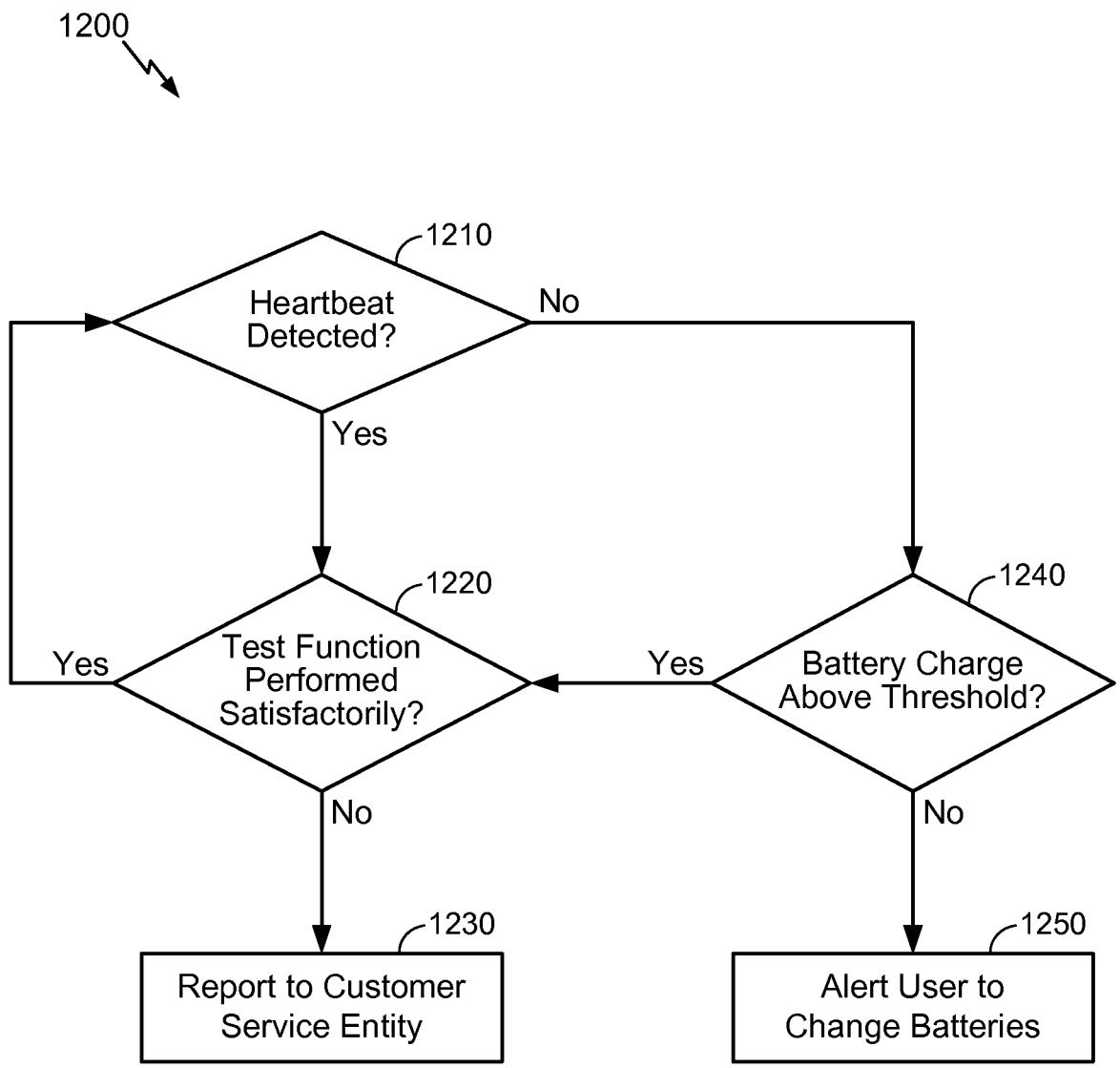
FIG. 12 illustrates another example of a method by which an IoE management device can manage a MD.

FIG. 12 generally illustrates another example of a method 1200 by which an IoE management device 710 can manage a MD, for example, a smoke detector.

At 1210 the IoE management device 710 determines if a smoke detector heartbeat is detected. If the smoke detector heartbeat is detected, the method 1200 proceeds to 1220. Otherwise, the method proceeds to 1240.

At 1220, the IoE management device 710 commands the smoke detector to perform a test function. It will be understood that the IoE management device 710 may be incorporated into the smoke detector itself, just as the 7101 may be incorporated into any MD or IoE device set forth in the present disclosure. If the test function is not performed satisfactorily, then the method 1200 proceeds to 1230. Otherwise, the method 1200 loops back to 1210.

At 1230 the IoE management device 710 sends a customer service report to a customer service entity, for example, the customer service entity 770.

At 1240, in response to the determination at 1210 that no smoke detector heartbeat has been detected, the IoE management device 710 determines whether the smoke detector battery charge is above a threshold. If the smoke detector battery charge is not above the threshold, then the method proceeds to 1250. Otherwise, the method 1200 proceeds to 1220, where (as noted above) the IoE management device 710 commands the smoke detector to perform a test function.

At 1250, the IoE management device 710 alerts the owner or operator of the smoke detector to change the smoke detector batteries in any suitable manner.

In another example of a method by which an IoE management device 710 can manage a MD, consider a refrigerator 116 that can scan the items in the refrigerator 116 using one or more IoE devices (comprising sensors) included in the refrigerator 116. The sensors can detect the age and quantity of the groceries in the refrigerator 116. The IoE management device 710 can receive and aggregate this sensor data. Moreover, the IoE management device 710 can analyze the sensor data to determine if there is an abnormality, for example, the IoE management device 710 can determine that the groceries are old or that the groceries are running out. Accordingly, the IoE management device 710 can send a customer service report to an online grocer which the online grocer can use to replenish the groceries in the refrigerator 116. Moreover, the aggregated data can also include indications that the owner and/or operator of the refrigerator 116 will be on vacation, or that the owner and/or operator of the refrigerator 116 is having a party. The IoE management device 710 can analyze this data and determine, for example, that the replenishment is unnecessary in view of the owner's pending vacation (i.e., that the lack of fresh groceries is not in fact abnormal). On the other hand, the IoE management device 710 can analyze this data and determine that ordinary replenishment will not be sufficient due to the number of guests on the guest list for the party and determine that an augmented replenishment is necessary in view of the owner's pending party (i.e., that the normal replenishment of groceries would be abnormal).

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoE device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for an Internet of Everything management device to automate customer service for a monitored device (MD), comprising:
   collecting sensor data from a plurality of sensors, wherein the plurality of sensors comprises a first sensor that is not included in the MD;
   determining whether the MD is exhibiting abnormal behavior based on an analysis of the collected sensor data; and
   transmitting a report to a customer service entity associated with the MD in response to a determination that the MD is exhibiting abnormal behavior, wherein collecting sensor data from the plurality of sensors comprises:
   receiving relevancy data, wherein the relevancy data includes an identity of the first sensor and indicates that the first sensor is capable of collecting sensor data that is relevant to behavior of the MD.

2. The method of claim 1, wherein:
   the first sensor of the plurality of sensors comprises at least one of (i) a peripheral device sensor that is included in a peripheral device, (ii) an environmental sensor associated with an environment of the MD, (iii) a legacy device sensor associated with a legacy device, (iv) a management device sensor associated with the Internet of Everything management device, or (v) any combination of (i) through (iv); and
   the plurality of sensors further comprises a monitored device sensor that is included in the MD.

3. The method of claim 1, wherein collecting sensor data from the plurality of sensors further comprises:
   transmitting a first sensor data request to the first sensor;
   receiving first sensor data from the first sensor; and
   aggregating the first sensor data into an aggregated MD data set based on the received relevancy data.

4. The method of claim 3, wherein:
   the relevancy data further indicates that a second sensor of the plurality of sensors is capable of collecting sensor data that is relevant to behavior of the MD; and
   collecting sensor data from the plurality of sensors further comprises:
   transmitting a second sensor data request to the second sensor;
   receiving second sensor data from the second sensor; and
   aggregating the second sensor data into the aggregated MD data set.

5. The method of claim 3, further comprising:
   converting the aggregated MD data set into an anonymous MD data log; and
   transmitting the anonymous MD data log to the customer service entity.

6. The method of claim 1, wherein determining whether the MD is exhibiting abnormal behavior comprises:
   receiving behavioral data relating to the recognition of abnormal behavior of the MD;
   analyzing the collected sensor data based on the received behavioral data; and
   determining that the MD is exhibiting abnormal behavior based on the analysis.

7. The method of claim 6, wherein analyzing the collected sensor data based on the received behavioral data comprises:
   establishing a first range of sensor values based on the received behavioral data; and determining whether a first sensor value associated with the first sensor of the plurality of sensors is within the first range of sensor values.

8. The method of claim 7, wherein determining that the MD is exhibiting abnormal behavior based on the analysis comprises determining that the MD is exhibiting abnormal behavior in response to a determination that the first sensor value is not within the first range of sensor values.

9. The method of claim 7, wherein analyzing the collected sensor data based on the received behavioral data further comprises:
establishing a second range of sensor values based on the received behavioral data; and
transmitting a second sensor data request to a second sensor of the plurality of sensors in response to the determination that the first sensor value is not within the first range of sensor values;
receiving a second sensor value from the second sensor; and
determining whether the second sensor value is within the second range of sensor values.

10. The method of claim 9, wherein determining that the MD is exhibiting abnormal behavior based on the analysis comprises determining that the MD is exhibiting abnormal behavior in response to a determination that the first sensor value is not within the first range of sensor values and that the second sensor value is not within the second range of sensor values.

11. An Internet of Everything management device for automating customer service for a monitored device (MD), comprising:
a processor configured to:
collect sensor data from a plurality of sensors, wherein the plurality of sensors comprises a first sensor that is not included in the MD;
determine whether the MD is exhibiting abnormal behavior based on an analysis of the collected sensor data; and
transmit a report to a customer service entity associated with the MD in response to a determination that the MD is exhibiting abnormal behavior; and
a memory, coupled to the processor, to store related data and instructions, wherein to collect sensor data, the processor is further configured to:
receive relevancy data, wherein the relevancy data includes an identity of the first sensor and indicates that the first sensor is capable of collecting sensor data that is relevant to behavior of the MD.

12. The Internet of Everything management device of claim 11, wherein:
the first sensor of the plurality of sensors comprises at least one of (i) a peripheral device sensor that is included in a peripheral device, (ii) an environmental sensor associated with an environment of the MD, (iii) a legacy device sensor associated with a legacy device, (iv) a management device sensor associated with the management device, or (v) any combination of (i) through (iv); and
the plurality of sensors further comprises a monitored device sensor that is included in the MD.

13. The Internet of Everything management device of claim 11, wherein to collect sensor data, the processor is further configured to:
transmit a first sensor data request to the first sensor;
receive first sensor data from the first sensor; and
aggregate the first sensor data into an aggregated MD data set based on the received relevancy data.

14. The Internet of Everything management device of claim 13, wherein:
the relevancy data further indicates that a second sensor of the plurality of sensors is capable of collecting sensor data that is relevant to behavior of the MD; and
to collect sensor data from the plurality of sensors further, the processor is further configured to:
transmit a second sensor data request to the second sensor;
receive second sensor data from the second sensor; and
aggregate the second sensor data into the aggregated MD data set.

15. The Internet of Everything management device of claim 13, wherein the processor is further configured to:
convert the aggregated MD data set into an anonymous MD data log; and
transmit the anonymous MD data log to the customer service entity.

16. The Internet of Everything management device of claim 11, wherein to determine whether the MD is exhibiting abnormal behavior, the processor is configured to:
receive behavioral data relating to the recognition of abnormal behavior of the MD;
analyze the collected sensor data based on the received behavioral data; and
determine that the MD is exhibiting abnormal behavior based on the analysis.

17. The Internet of Everything management device of claim 16, wherein to analyze the collected sensor data based on the received behavioral data, the processor is configured to:
establish a first range of sensor values based on the received behavioral data; and
determine whether a first sensor value associated with the first sensor of the plurality of sensors is within the first range of sensor values.

18. The Internet of Everything management device of claim 17, wherein to determine that the MD is exhibiting abnormal behavior based on the analysis, the processor is configured to determine that the MD is exhibiting abnormal behavior in response to a determination that the first sensor value is not within the first range of sensor values.

19. The Internet of Everything management device of claim 17, wherein to analyze the collected sensor data based on the received behavioral data, the processor is further configured to:
establish a second range of sensor values based on the received behavioral data; and
transmit a second sensor data request to a second sensor of the plurality of sensors in response to the determination that the first sensor value is not within the first range of sensor values;
receive a second sensor value from the second sensor; and
determine whether the second sensor value is within the second range of sensor values.

20. The Internet of Everything management device of claim 19, wherein to determine that the MD is exhibiting abnormal behavior based on the analysis, the processor is configured to determine that the MD is exhibiting abnormal behavior in response to a determination that the first sensor value is not within the first range of sensor values and that the second sensor value is not within the second range of sensor values.

21. An Internet of Everything management device for automating customer service for a monitored device (MD), comprising:

means for collecting sensor data from a plurality of sensors, wherein the plurality of sensors comprises a first sensor that is not included in the MD;

means for determining whether the MD is exhibiting abnormal behavior based on an analysis of the collected sensor data; and means for transmitting a report to a customer service entity associated with the MD in response to a determination that the MD is exhibiting abnormal behavior, wherein the means for collecting sensor data from the plurality of sensors comprises:

means for receiving relevancy data, wherein the relevancy data includes an identity of the first sensor and indicates that the first sensor is capable of collecting sensor data that is relevant to behavior of the MD.

22. The Internet of Everything management device of claim 21, wherein means for collecting sensor data from the plurality of sensors further comprises:

means for transmitting a first sensor data request to the first sensor;

means for receiving first sensor data from the first sensor; and means for aggregating the first sensor data into an aggregated MD data set based on the received relevancy data.

23. The Internet of Everything management device of claim 21, wherein the means for determining whether the MD is exhibiting abnormal behavior comprises:

means for receiving behavioral data relating to the recognition of abnormal behavior of the MD;

means for analyzing the collected sensor data based on the received behavioral data; and means for determining that the MD is exhibiting abnormal behavior based on the analysis.

24. The Internet of Everything management device of claim 23, wherein the means for analyzing the collected sensor data based on the received behavioral data comprises:

means for establishing a first range of sensor values based on the received behavioral data; and means for determining whether a first sensor value associated with the first sensor of the plurality of sensors is within the first range of sensor values.

25. The Internet of Everything management device of claim 24, wherein the means for analyzing the collected sensor data based on the received behavioral data further comprises:

means for establishing a second range of sensor values based on the received behavioral data; and means for transmitting a second sensor data request to a second sensor of the plurality of sensors in response to the determination that the first sensor value is not within the first range of sensor values;

means for receiving a second sensor value from the second sensor; and means for determining whether the second sensor value is within the second range of sensor values.

26. A non-transitory computer-readable medium comprising code, which, when executed by a processor, causes the processor to perform operations for automating customer service for a monitored device (MD), the non-transitory computer-readable medium comprising:

code for collecting sensor data from a plurality of sensors, wherein the plurality of sensors comprises a first sensor that is not included in the MD;

code for determining whether the MD is exhibiting abnormal behavior based on an analysis of the collected sensor data; and code for transmitting a report to a customer service entity associated with the MD in response to a determination that the MD is exhibiting abnormal behavior, wherein the code for collecting sensor data from the plurality of sensors comprises:

code for receiving relevancy data, wherein the relevancy data includes an identity of the first sensor and indicates that the first sensor is capable of collecting sensor data that is relevant to behavior of the MD.

27. The non-transitory computer-readable medium comprising code of claim 26, wherein code for collecting sensor data from the plurality of sensors further comprises:

code for transmitting a first sensor data request to the first sensor;

code for receiving first sensor data from the first sensor; and code for aggregating the first sensor data into an aggregated MD data set based on the received relevancy data.

28. The non-transitory computer-readable medium comprising code of claim 26, wherein code for determining whether the MD is exhibiting abnormal behavior comprises:

code for receiving behavioral data relating to the recognition of abnormal behavior of the MD;

code for analyzing the collected sensor data based on the received behavioral data; and code for determining that the MD is exhibiting abnormal behavior based on the analysis.

29. The non-transitory computer-readable medium comprising code of claim 28, wherein code for analyzing the collected sensor data based on the received behavioral data comprises:

code for establishing a first range of sensor values based on the received behavioral data; and code for determining whether a first sensor value associated with the first sensor of the plurality of sensors is within the first range of sensor values.

30. The non-transitory computer-readable medium comprising code of claim 29, wherein code for analyzing the collected sensor data based on the received behavioral data further comprises:

code for establishing a second range of sensor values based on the received behavioral data; and code for transmitting a second sensor data request to a second sensor of the plurality of sensors in response to the determination that the first sensor value is not within the first range of sensor values;

code for receiving a second sensor value from the second sensor; and code for determining whether the second sensor value is within the second range of sensor values.

* * * * *